United States Patent
Tsaur et al.

(10) Patent No.: US 9,489,271 B1
(45) Date of Patent: Nov. 8, 2016

(54) USER INTERFACE FOR RESTORING DATABASES

(75) Inventors: Ynn-Pyng "Anker" Tsaur, Oviedo, FL (US); Lijo J. Abraham, Lake Mary, FL (US); Michael A. Payne, Archer, FL (US); Gregory R. Dowers, II, Lake Mary, FL (US); Francisco Surroca, Longwood, FL (US); Ping Wang, Sanford, FL (US); Lee M. Doucette, Deltona, FL (US)

(73) Assignee: Veritas Technologies LLC, Mountain View, CA (US)

( * ) Notice: Subject to any disclaimer, the term of this patent is extended or adjusted under 35 U.S.C. 154(b) by 59 days.

(21) Appl. No.: 13/433,709

(22) Filed: Mar. 29, 2012

(51) Int. Cl.
*G06F 17/30* (2006.01)
*G06F 11/14* (2006.01)

(52) U.S. Cl.
CPC ..... *G06F 11/1469* (2013.01); *G06F 17/30312* (2013.01); *G06F 17/30297* (2013.01); *G06F 17/30371* (2013.01)

(58) Field of Classification Search
CPC .......... G06F 17/30123; G06F 17/30076; G06F 17/2288; G06F 11/1469; G06F 11/1448; G06F 11/1461; G06F 17/30371; G06F 17/30297; G06F 17/30312
USPC ........ 707/640, 679, 752, 661, 660, 654, 653
See application file for complete search history.

(56) References Cited

U.S. PATENT DOCUMENTS

| | | | |
|---|---|---|---|
| 5,220,657 A * | 6/1993 | Bly | G06F 17/30171 707/E17.007 |
| 5,642,505 A * | 6/1997 | Fushimi | G06F 11/1458 |
| 6,628,660 B1 * | 9/2003 | Morse | G05B 19/045 370/395.7 |
| 6,687,878 B1 * | 2/2004 | Eintracht | G06F 17/241 707/E17.117 |
| 6,877,137 B1 * | 4/2005 | Rivette | G06F 17/30876 707/E17.112 |
| 6,885,999 B1 * | 4/2005 | Corless | G06F 17/30876 705/54 |
| 7,437,388 B1 * | 10/2008 | DeVos | |
| 7,827,159 B2 * | 11/2010 | Dettinger et al. | 707/698 |
| 8,042,172 B1 * | 10/2011 | Heithcock | G06F 11/1466 707/674 |
| 8,099,392 B2 * | 1/2012 | Paterson | G06F 11/1458 707/654 |
| 8,200,633 B2 * | 6/2012 | Bendakovsky et al. | 707/640 |
| 8,224,872 B2 * | 7/2012 | Dettinger et al. | 707/804 |
| 8,341,127 B1 * | 12/2012 | Heithcock et al. | 707/679 |
| 8,364,640 B1 * | 1/2013 | Beatty et al. | 707/640 |
| 8,543,549 B2 * | 9/2013 | Barsness et al. | 707/649 |
| 8,566,361 B2 * | 10/2013 | Zha et al. | 707/796 |
| 8,800,023 B2 * | 8/2014 | Heithcock | G06F 11/1466 707/674 |
| 8,819,471 B2 * | 8/2014 | Alsina | G06F 11/1458 713/300 |

(Continued)

OTHER PUBLICATIONS

Active Directory backup and restore with Acronis Backup & Recovery 11, Technical white paper, Copyright © Acronis, Inc., 2000-2011.*

*Primary Examiner* — Jean M Corrielus
(74) *Attorney, Agent, or Firm* — Campbell Stephenson LLP

(57) ABSTRACT

Various systems and methods for restoring data in distributed storage systems. For example, one method involves receiving a first selection, where the first selection identifies data abstraction. The data abstraction represents a data source that can be restored. The method also involves receiving a second selection, where the second selection identifies a restore operation, and where the restore operation is associated with the data abstraction. The method also involves determining data to be restored, where this determination is based on the data source(s) (as can be determined from the data abstraction) and on the second selection. Data can then be restored based on the determined data.

20 Claims, 19 Drawing Sheets

(56) References Cited

U.S. PATENT DOCUMENTS

| | | | |
|---|---|---|---|
| 8,868,859 B2* | 10/2014 | Schmidt | G06F 11/1469 707/679 |
| 2003/0046313 A1* | 3/2003 | Leung et al. | 707/204 |
| 2004/0205050 A1* | 10/2004 | Stevens et al. | 707/3 |
| 2006/0206544 A1* | 9/2006 | Oks et al. | 707/204 |
| 2007/0266394 A1* | 11/2007 | Odent | G06Q 10/06 719/316 |
| 2008/0250072 A1* | 10/2008 | Nguyen et al. | 707/200 |
| 2009/0307333 A1* | 12/2009 | Welingkar et al. | 709/219 |
| 2010/0293147 A1* | 11/2010 | Snow et al. | 707/640 |
| 2011/0016089 A1* | 1/2011 | Freedman et al. | 707/640 |
| 2012/0117033 A1* | 5/2012 | Vaidya et al. | 707/679 |
| 2012/0150806 A1* | 6/2012 | Barsness et al. | 707/646 |
| 2012/0151272 A1* | 6/2012 | Behrendt | G06F 9/542 714/39 |
| 2012/0310889 A1* | 12/2012 | McNeil et al. | 707/639 |
| 2012/0310894 A1* | 12/2012 | Freedman et al. | 707/674 |
| 2012/0310896 A1* | 12/2012 | Freedman et al. | 707/679 |
| 2012/0311280 A1* | 12/2012 | Schmidt | G06F 11/1469 711/162 |

* cited by examiner

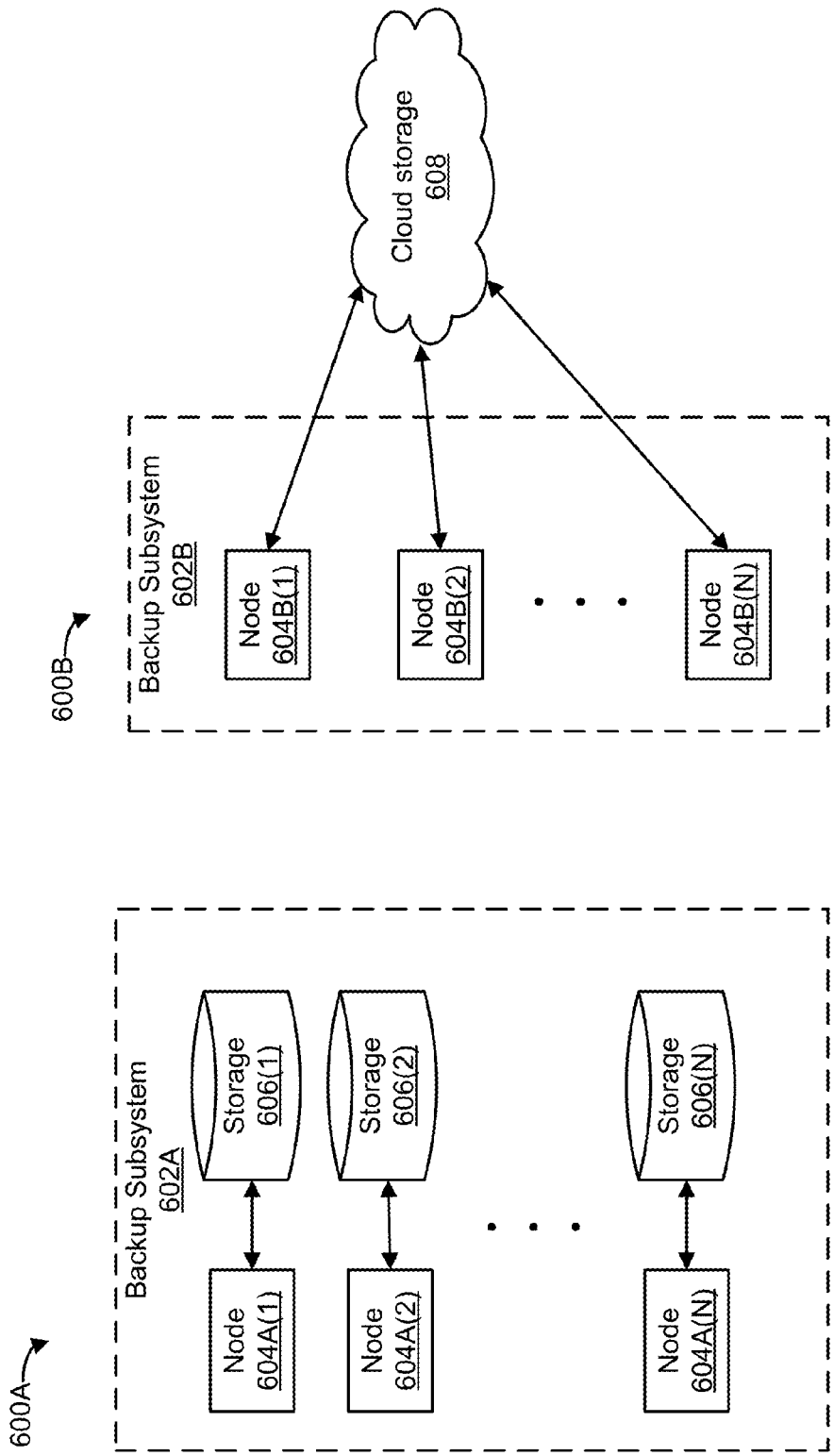

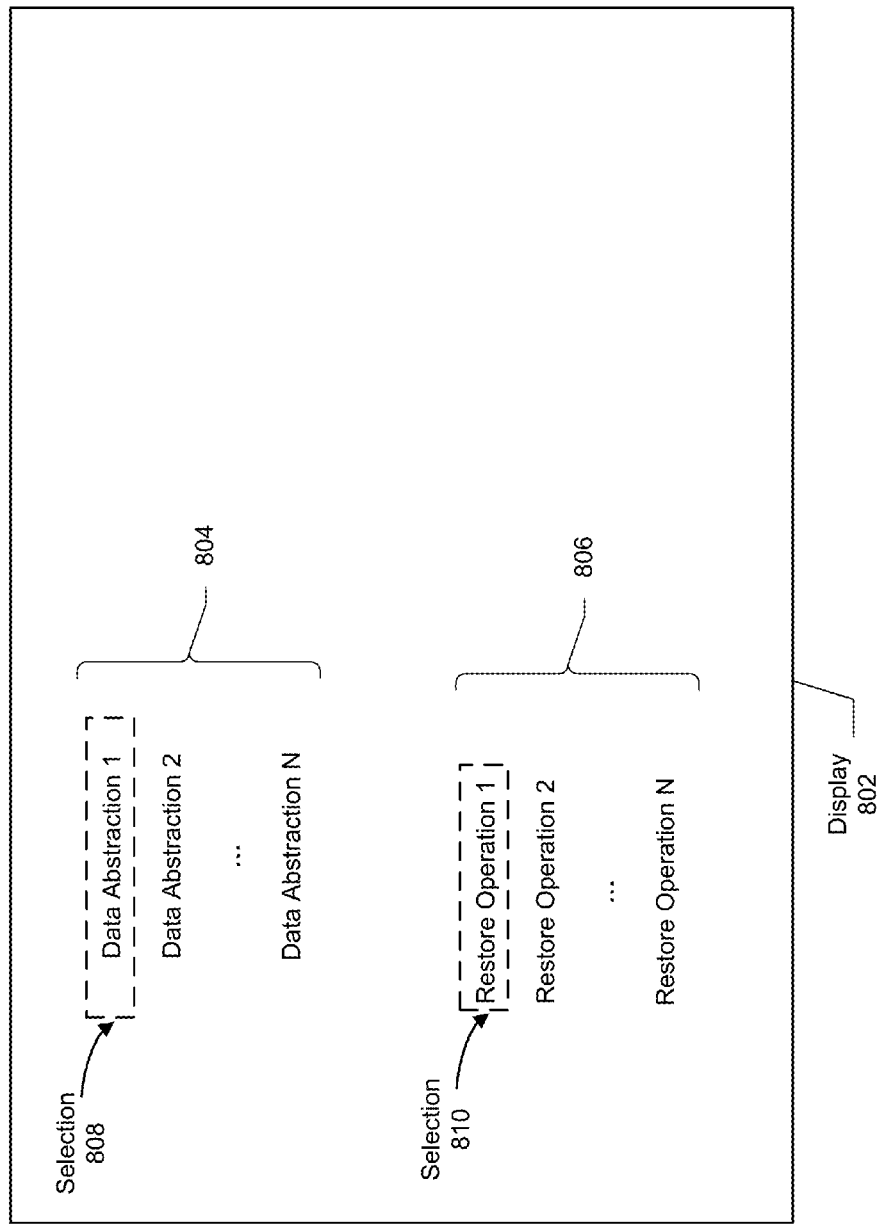

USER INTERFACE FOR RESTORING DATABASES

BACKGROUND OF THE INVENTION

1. Field of the Invention

This application relates to backup and restoration of databases. Particularly, this application relates to a user interface for restoring such databases.

2. Description of the Related Art

Companies today extensively rely on online, frequently accessed, constantly changing data to run their businesses. Unplanned events that inhibit the availability of this data can seriously damage business operations. Additionally, any permanent data loss, from natural disaster or any other source, will likely have serious negative consequences for the continued viability of a business. Therefore, when disaster strikes, companies must be prepared to eliminate or minimize data loss, and recover quickly with useable data.

Data backup can be used to prevent data loss in case of any such disaster. A data backup process typically creates copies of original data. These copies can be used to restore the original data after a data loss event. The backed-up data can be stored using a variety of media, such as magnetic tape, hard drives, and/or optical storage, among others. Various techniques can be used to generate such backups, such full backups, incremental backups, or differential backups, among others.

BRIEF DESCRIPTION OF THE DRAWINGS

The embodiments of the present application may be better understood, and its numerous objects, features, and advantages made apparent to those skilled in the art by referencing the accompanying drawings.

FIGS. 6A and 6B are block diagrams of backup subsystems, according to some embodiments.

FIGS. 8A and 8B illustrate example user interfaces for restoring data in distributed systems, according to some embodiments.

Figure 1:
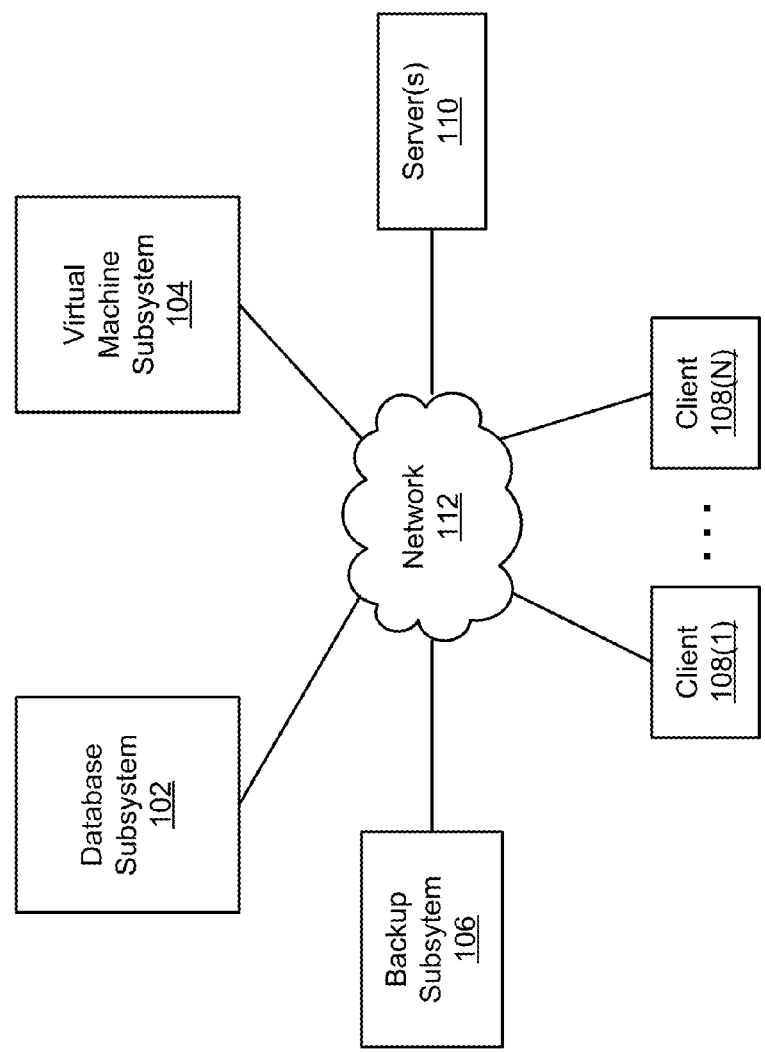
FIG. 1 is a block diagram illustrating a distributed system, according to one embodiment.

While the embodiments of the application are susceptible to various modifications and alternative forms, specific embodiments are provided as examples in the drawings and detailed description. It should be understood that the drawings and detailed description are not intended to limit the embodiments to the particular form disclosed. Instead, the intention is to cover all modifications, equivalents and alternatives falling within the spirit and scope of the invention as defined by the appended claims.

DETAILED DESCRIPTION

Although the present invention has been described in connection with several embodiments, the invention is not intended to be limited to the specific forms set forth herein. On the contrary, it is intended to cover such alternatives, modifications, and equivalents as can be reasonably included within the scope of the invention as defined by the appended claims.

Modern distributed storage environments may include multiple storage objects connected via one or more interconnection networks. The interconnection networks provide the infrastructure to connect the various elements of a distributed shared storage environment. Storage systems frequently use data redundancy mechanisms to ensure data integrity, consistency, and availability. Other uses for data redundancy may include backing up data, distributed load sharing, disaster recovery, or point-in-time analysis and reporting. One approach to data redundancy is to back up data, such as database data, from a primary storage system to a second storage system. The backed-up data can be then restored, such as after a data loss event, or upon a failure of the primary storage system. The following description is directed to methods and systems for using a user interface for restoring databases.

FIG. 1 is a block diagram illustrating a distributed system 100 that includes a collection of server(s), client(s), and storage. Distributed system 100 includes several nodes and/or subsystems, e.g., a database subsystem 102, a virtual machine (VM) subsystem 104, a backup subsystem 106, one or more clients 108(1)-108(N), one or more servers 110, and a network 112. Each of database subsystem 102, virtual machine subsystem 104, backup subsystem 106, client(s) 108(1)-108(N), and/or server(s) 110 can communicate with each other using a network, e.g., network 112. Network 112 can include a local area network (LAN), a wide area network (WAN), a storage area network (SAN), Ethernet, and/or any combination thereof. It is noted that distributed system 100 may include a different number of elements.

Database subsystem 102 can include various databases, such as SQL databases. These databases can be accessed, through network 112, by client(s) 108(1)-108(N). Virtual machine subsystem 104 can host multiple virtual machines, each of which can include various applications. These applications can be accessed by clients 108(1)-108(N). The applications that execute on these virtual machines can include one or more databases, such as SQL databases.

Backup subsystem 106 includes various backups of database subsystem 102 and/or virtual machine subsystem 104. These various backups can be created using various backup techniques, e.g., full backups, incremental backups, differential backups, among others. In one embodiment, server 110 can automatically create (e.g., by using backup subsystem 106) backups of database subsystem 102 and/or virtual machine subsystem 104. In one embodiment, client 108(1) can instruct backup subsystem 106 (e.g., using server 110) to create backups of database subsystem 102 and/or virtual machine subsystem 104. These backups can include multiple backup sets, created for the databases in 102 and/or virtual machine subsystem 104. The backup sets can be created using a variety of backup methods, including streaming or block-level full backup, streaming or block-level incremental backup, differential backup, and/or log backup, among others.

In one embodiment, client 108(1) accesses (e.g., over network 112) database subsystem 102 and/or virtual machine subsystem 104. For example, client 108(1) can access an SQL database in database subsystem 102 and/or access various applications in virtual machine subsystem 104. In one embodiment, client 108(1) can access server 110 to create backups of database subsystem 102 and/or virtual machine subsystem 104 (e.g., using backup subsystem 106). Client 108(1) can access server 110 to restore one or more of the backups of database subsystem 102 and/or virtual machine subsystem 104. In one embodiment, client 108(1) can access server 110, using a user interface, to initiate such a restore operation. In one embodiment, client 108(1) can also access backup subsystem 106 directly to initiate the restore operation. Server 110 can facilitate display of a user interface that includes data abstractions of database(s) that can be recovered, as well as restore operations that can be performed on these databases. Server 110 can receive selections of data abstraction(s) and restore operation, and determine the backup sets that correspond to these selections, as described below.

Figure 2A:
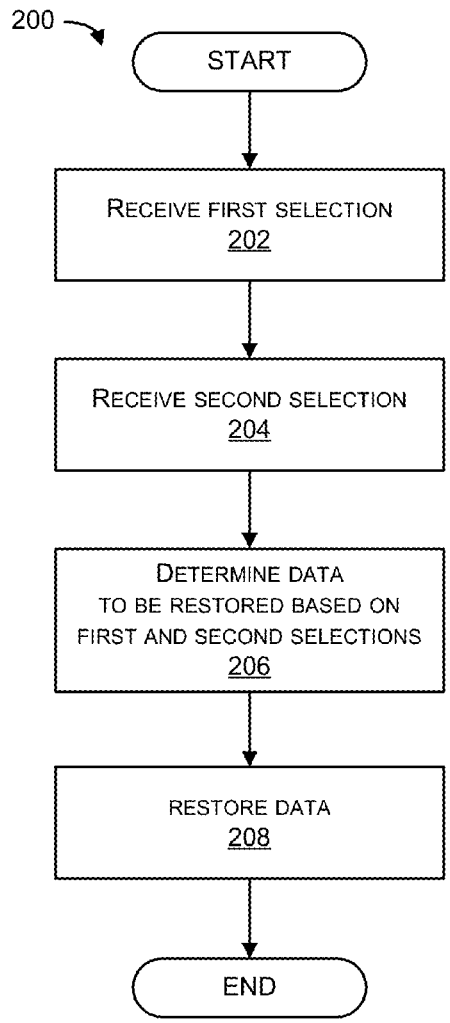
FIGS. 2A and 2B are flowcharts illustrating methods for restoring data in distributed systems, according to one or more embodiments.

FIG. 2A is a flowchart illustrating a method 200 for restoring data in distributed systems, according to one or more embodiments. As will be appreciated in light of the present disclosure, this method may be modified in order to derive alternative embodiments. Also, the operations in this embodiment are shown in sequential order. However, certain operations may occur in a different order than shown, certain operations may be performed concurrently, certain operations may be combined with other operations, and certain operations may be absent in another embodiment. Method 200 is described with reference to variations of the elements described in connection with FIG. 1. In one embodiment, method 200 can be executed on server 110. In another embodiment, method 200 can be executed on backup subsystem 106. In yet another embodiment, method 200 can be executed on client 108(1).

In element 202, a first selection is received. For example, server 110 can receive a selection that identifies a data abstraction. The data abstraction represents a data source, such as a database that can be restored. In one embodiment, this selection is chosen from multiple data abstractions, where each abstraction represents a different data source. In one implementation, graphical elements for the multiple data abstractions can be displayed, e.g., in a graphical user interface (GUI). The server can then receive a selection of one of these the data abstractions, e.g., by a selection of a corresponding graphical element from the GUI.

In element 204, a second selection is received. For example, server 110 can receive a selection that identifies a restore operation. The restore operation is associated with the data abstraction. In one embodiment, this selection is chosen from multiple restore operations, where each restore operation is associated with the data source (e.g., with a database that can be restored). In one embodiment, each of these multiple restore operations is customized for the selected data abstraction, such that each restore operation can be performed for the selected data abstraction. In other words, restore operations that cannot be performed for the selected data abstraction are not made available as one of the choices. In one implementation, graphical elements for the multiple restore operations can be displayed, e.g., in the GUI. The server can then receive a selection of one of these the restore operations, e.g., by a selection of a corresponding graphical element from the GUI.

In element 206, data to be restored is determined based on the first and second selections. For example, server 110 can determine what data is to be restored based on the first and second selections. In other words, the selections of the data abstraction and the restore operation are used to determine what data will be restored. However, the selections do not directly indicate what data will be restored. In one embodiment, further details regarding how data to be restored is determined based on the first and second selections are found in Tsaur et al., U.S. patent application Ser. No. 13/314,771, filed on Dec. 8, 2011, entitled "Systems and Methods for Restoring Application Data," which is incorporated by reference herein in its entirety and for all purposes.

In element 208, data is restored. For example, server 110 can communicate with backup subsystem 106 (e.g., to instruct backup subsystem 106) to restore data. For example, the data to be restored can include several sets of backup data that is stored by backup subsystem 106. Server 110 can communicate with backup subsystem 106 to restore these several sets of backup data. Sever 110 can restore these backup sets to the client requesting the backup, to database subsystem 102 and/or virtual machine subsystem 104, and/or to another location.

Figure 2B:
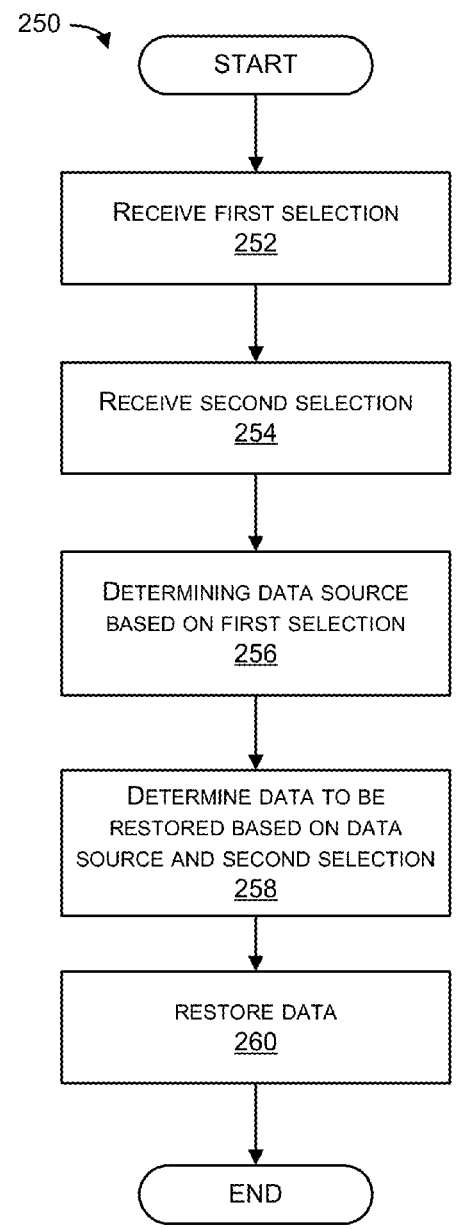

FIG. 2B is a flowchart illustrating a method 250 for restoring data in distributed systems, according to one or more embodiments. As will be appreciated in light of the present disclosure, this method may be modified in order to derive alternative embodiments. Also, the operations in this embodiment are shown in sequential order. However, certain operations may occur in a different order than shown, certain operations may be performed concurrently, certain operations may be combined with other operations, and certain operations may be absent in another embodiment. Method 250 is described with reference to variations of the elements described in connection with FIG. 1. In one embodiment, method 250 can be executed on server 110. In another embodiment, method 250 can be executed on backup subsystem 106. In yet another embodiment, method 250 can be executed on client 108(1). In one embodiment, method 250 is a variation of method 200.

In element 252, a first selection is received. For example, server 110 can receive a selection that identifies a data abstraction. The data abstraction represents a data source, such as a database that can be restored. In one embodiment, this selection is chosen from multiple data abstractions, where each abstraction represents a different data source. In one implementation, graphical elements for the multiple data abstractions can be displayed, e.g., in a graphical user interface (GUI). The server can then receive a selection of one of these data abstractions, e.g., by a selection of a corresponding graphical element from the GUI. In one embodiment, element 252 is substantially similar to element 202.

In element 254, a second selection is received. For example, server 110 can receive a selection that identifies a restore operation. The restore operation is associated with the data abstraction. In one embodiment, this selection is chosen from multiple restore operations, where each restore operation is associated with the data source (e.g., with a database that can be restored). In one embodiment, each of these multiple restore operations is customized for the selected data abstraction, such that each restore operation can be performed for the selected data abstraction. In other words, restore operations that cannot be performed for the selected data abstraction (i.e., that cannot be performed for the recoverable database) are not made available as one of the choices. In one implementation, graphical elements for the multiple restore operations can be displayed, e.g., in the GUI. The server can then receive a selection of one of these restore operations, e.g., by a selection of a corresponding graphical element from the GUI. In one embodiment, element 254 is substantially similar to element 204.

In element 256, a data source is determined based on the first selection. For example, server 110 can determine one or more data sources that are represented by the data abstraction. In one embodiment, the data abstraction is mapped to the data source. For example, a selection (in element 252) of a data abstraction of data for a Human Resource Department is mapped to a certain database on a certain server. In one embodiment, this selection (in element 252) of a data abstraction of data for a Human Resource Department indicates backup sets that exist for the HR Department database(s). However, the data abstraction itself does not convey such level of complexity.

In element 258, data to be restored is determined based on the data source and the second selection. For example, server 110 can determine what data is to be restored based on the data source and the second selection. In other words, the data source and the selection of the restore operation are used to determine what data will be restored. However, the selections of elements 252 and 254 do not directly indicate what data will be restored. In one embodiment, further details regarding how data to be restored is determined based on the data source and the second selection are found in Tsaur et al., U.S. patent application Ser. No. 13/314,771, filed on Dec. 8, 2011, entitled "Systems and Methods for Restoring Application Data," which is incorporated by reference herein in its entirety and for all purposes.

In element 260, data is restored. For example, server 110 can communicate with backup subsystem 106 to restore data. For example, the data to be restored can include several sets of backup data that is stored by backup subsystem 106. Server 110 can communicate with backup subsystem 106 to restore these several sets of backup data. Sever 110 can restore these backup sets to the client requesting the backup, to database subsystem 102 and/or virtual machine subsystem 104, and/or to another location. In one embodiment, element 260 is substantially similar to element 208.

Figure 3A:
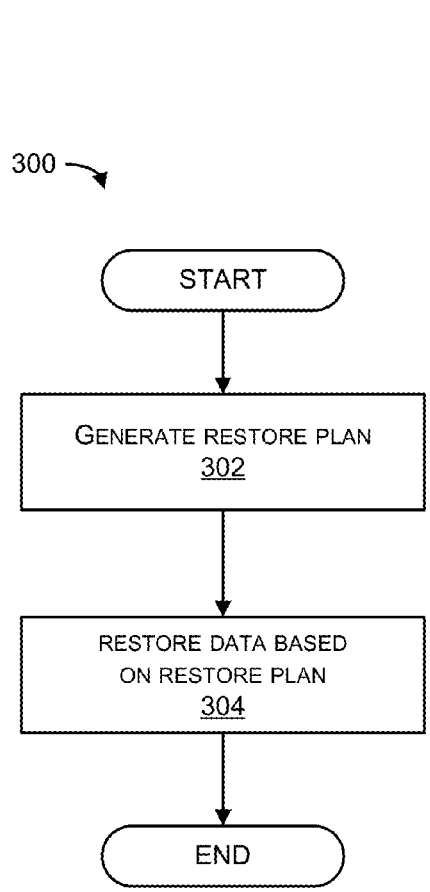
FIGS. 3A and 3B are flowcharts illustrating elements of methods for restoring data in distributed systems, according to one or more embodiments.

FIG. 3A is a flowchart illustrating a detailed method 300 for restoring data in distributed systems, according to one or more embodiments. As will be appreciated in light of the present disclosure, this method may be modified in order to derive alternative embodiments. Also, the operations in this embodiment are shown in sequential order. However, certain operations may occur in a different order than shown, certain operations may be performed concurrently, certain operations may be combined with other operations, and certain operations may be absent in another embodiment. Method 300 is described with reference to variations of the elements described in connection with FIG. 1. In one embodiment, method 300 can be executed on server 110. In another embodiment, method 300 can be executed on backup subsystem 106. In yet another embodiment, method 300 can be executed on client 108(1). In one embodiment, method 300 is a detailed view of elements 206 and 208 of method 200.

In another embodiment, method 300 is a detailed view of elements 258 and 260 of method 250.

In element 302, a restore plan is generated. In one embodiment, the restore plan can be generated based on the first and second selections. In another embodiment, the restore plan can be generated based on the data source (e.g., as determined in element 256) and on the second selection. The restore plan indicates what backup sets are needed to restore data according to the selected restore operation. The backup sets are selected based on first selection (i.e., identifying the data abstraction) or based on the data source. The restore plan can also include various restore parameters and/or indicate additional processing. In one embodiment, further details regarding how to generate a restore plan based are found in Tsaur et al., U.S. patent application Ser. No. 13/314,771, filed on Dec. 8, 2011, entitled "Systems and Methods for Restoring Application Data," which is incorporated by reference herein in its entirety and for all purposes.

In element 304, data is restored based on the restore plan. For example, server 110 can communicate with backup subsystem 106 to restore data according to the restore plan. For example, server 110 can communicate with backup subsystem 106 to restore each of the backup sets according to the restore parameters, as indicated by the restore plan.

Figure 3B:
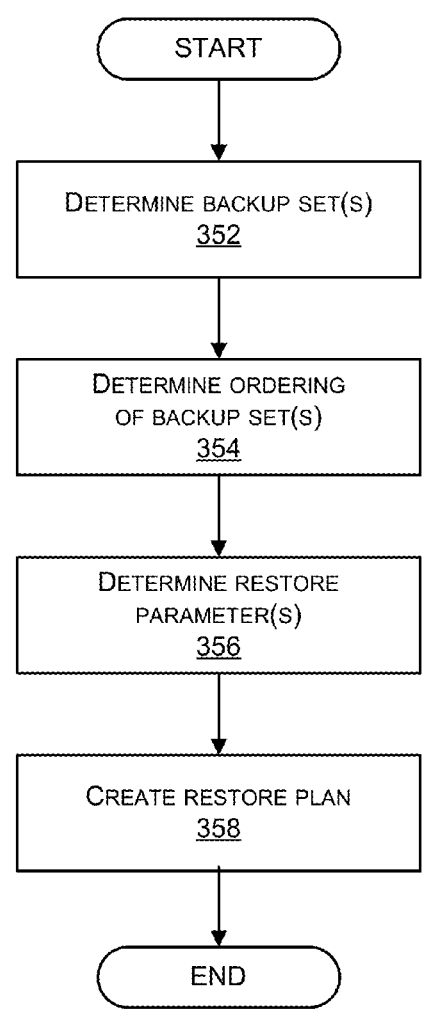

FIG. 3B is a flowchart illustrating a detailed method 350 for generating a restore plan, according to one or more embodiments. As will be appreciated in light of the present disclosure, this method may be modified in order to derive alternative embodiments. Also, the operations in this embodiment are shown in sequential order. However, certain operations may occur in a different order than shown, certain operations may be performed concurrently, certain operations may be combined with other operations, and certain operations may be absent in another embodiment. Method 350 is described with reference to variations of the elements described in connection with FIG. 1. In one embodiment, method 350 can be executed on server 110. In another embodiment, method 350 can be executed on backup subsystem 106. In yet another embodiment, method 350 can be executed on client 108(1). In one embodiment, method 350 is a detailed view of element 302 of method 300.

In element 352, backup sets are determined. As noted, backup subsystem 106 can include multiple backup sets for various databases of database subsystem 102 and/or for various VMs (and/or application(s) of those VMs) of VM subsystem 104. As noted, it is not necessary to select a subset of these backup sets for a restore operation. Instead, the subset needed for the restoration is calculated. For example, for the human resource (HR) example described above, element 352 can select a subset of backup sets that includes a latest full backup set of the HR database from multiple full backup sets of this HR database, a latest differential backup set of the HR database from multiple differential backup sets of this HR database, as well as potentially multiple log backup sets.

In element 354, ordering of the backup set(s) is determined. The order in which the restore operation is performed may impact the result, e.g., restored data may be different depending on the order in which various backup sets are restored in the above example, the restore plan can indicate that the full backup set should be applied first, followed by the latest differential backup, and any applicable log backup sets.

In element 356, restore parameters are determined. These restore parameters can indicate various parameters to be used when restoring the data. The restore parameters can indicate data integrity options of each backup set, how to recreate a directory structure for the data of each backup set, whether to use and/or copy access permissions for the data of each backup set, among others.

Figure 4:
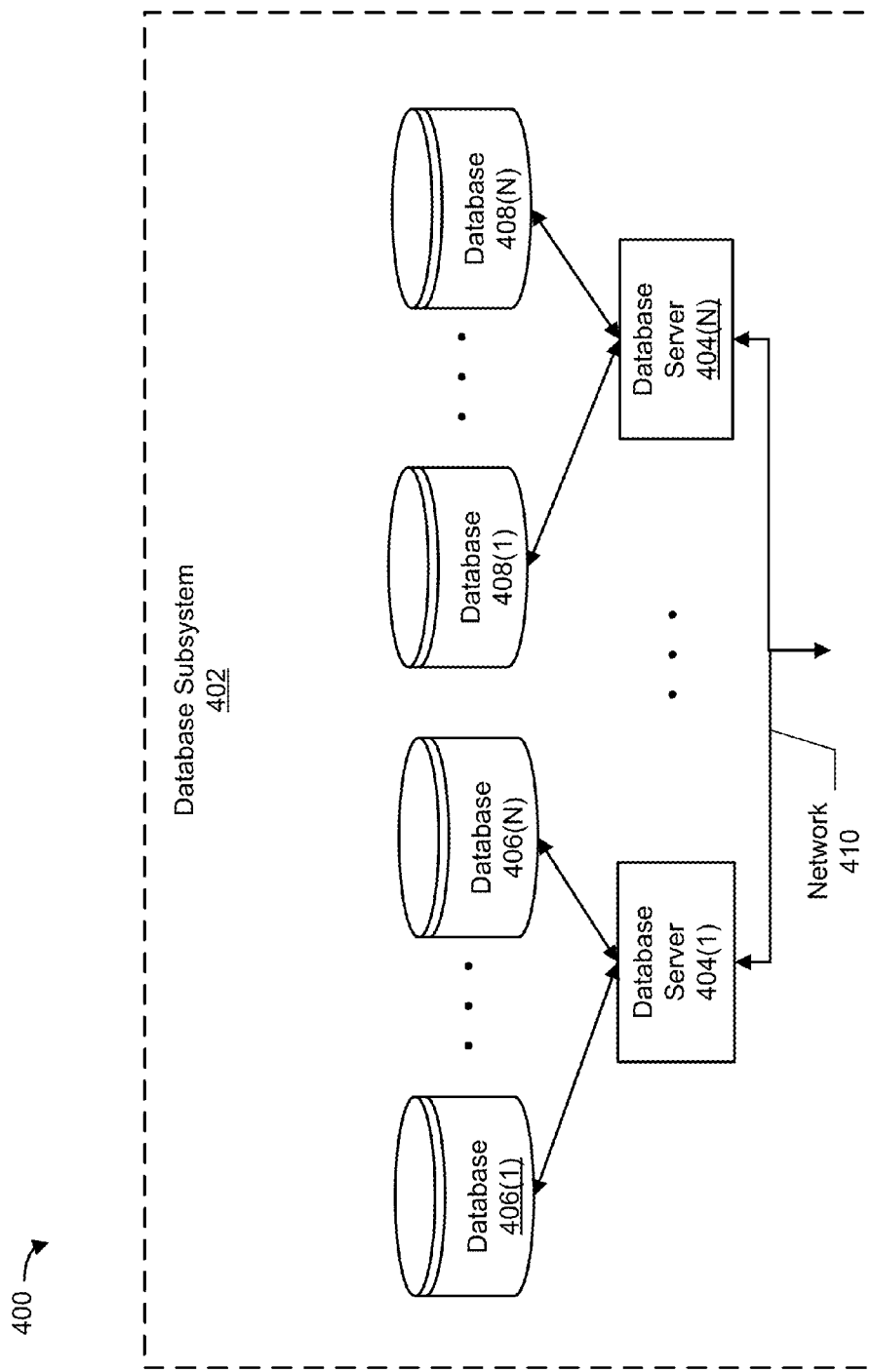
FIG. 4 is a block diagram of a database subsystem, according to one embodiment.

FIG. 4 is a block diagram 400 of a database subsystem 402, such as database subsystem 102 of FIG. 1. Database subsystem 102 can include one or more database servers 404(1)-404(N) and databases 406(1)-406(N) and 408(1)-408 (N). Each such database server can host one or more databases, such as SQL databases. In one embodiment, database server(s) 404(1)-404(N) can be managed by server 110, such as over network 410. Each database server 404 (1)-404(N) can be accessed by clients 108(1)-108(N). In one embodiment, each database 406(1)-406(N) can include one or more instances of a database hosted by database server 404(1). In one embodiment, each database 406(1)-406(N) can be stored using a separate storage unit. In one embodiment, backup subsystem 106 can generate backup sets for databases 406(1)-406(N) and 408(1)-408(N).

Figure 5:
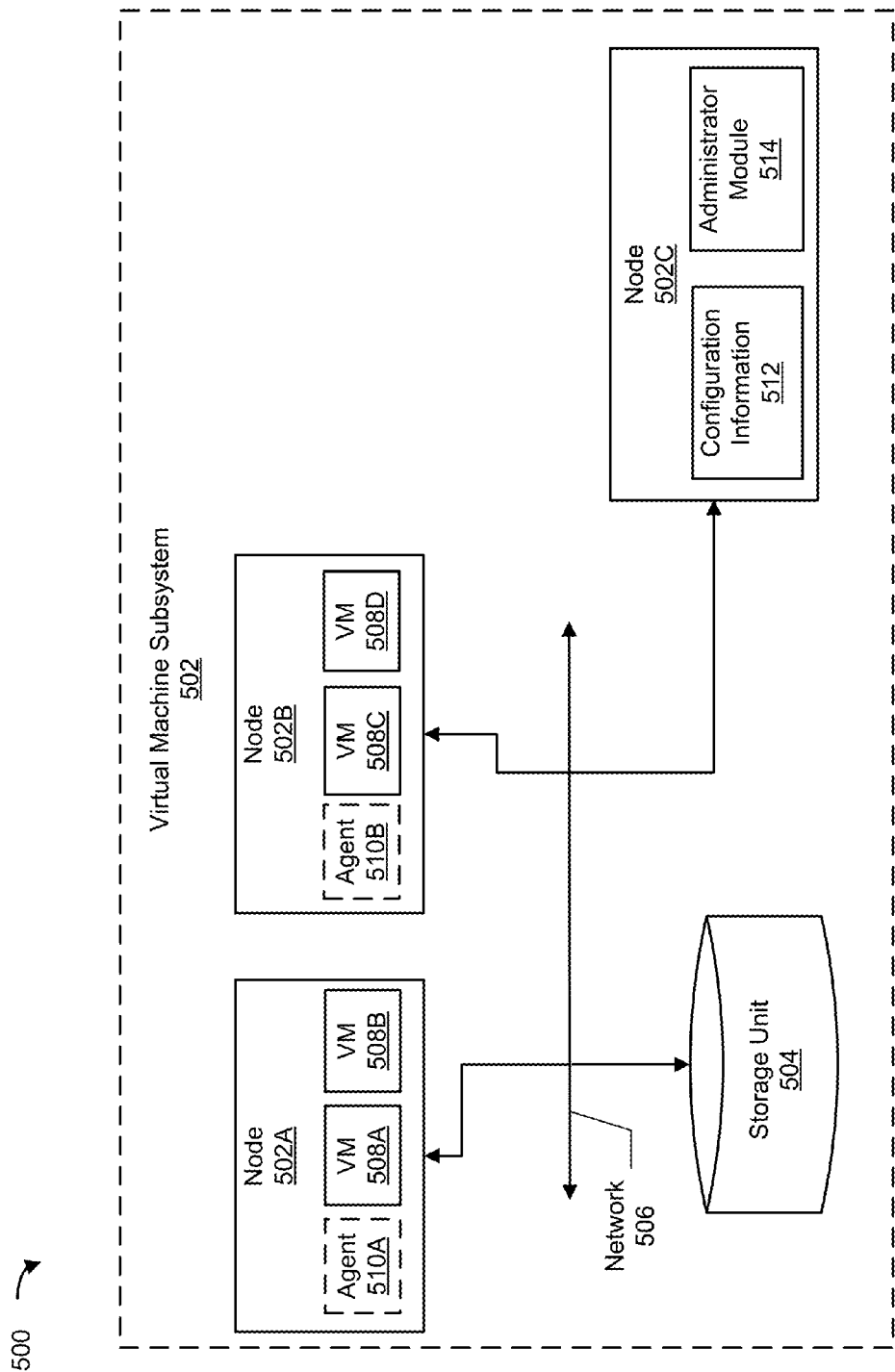
FIG. 5 is a block diagram of a virtual machine subsystem, according to one embodiment.

FIG. 5 is a block diagram 500 illustrating a virtual machine (VM) subsystem 502 that includes a collection of nodes and storage. VM subsystem 502 includes several nodes, e.g., nodes 502A, 502B, and 502C. Each node can communicate with storage, e.g., storage 504, using a network, e.g., network 506. Each such node can implement one or more virtual machines, e.g., virtual machines 508A-508D. In some embodiments, each node may implement virtual machines using hypervisor technology, although other designs are contemplated. Furthermore, some nodes can also implement an agent, e.g., agents 510A and 510B. In one embodiment, node(s) (e.g., node 502C) include configuration information 512 for node(s) and/or VMs. In one embodiment, administrator module 514 (and/or agent(s)) access virtual machine configuration 512 associated with VMs hosted by nodes 502A-502B.

In one embodiment, nodes 502A-502C can be managed by server 110, such as over network 506. In one embodiment, each VM 508A-508(D) can host a different application. Each VM 508A-508D can be accessed by clients 108(1)-108(N), such as over network 506. Furthermore, each application (e.g., an SQL database) hosted by each such VM 508A-508D can be accessed by clients 108(1)-108(N), such as over network 506. VMs 508A-508D can store data to storage unit 504. In one embodiment, backup subsystem 106 can generate backup sets for VMs 508A-508D, such as for individual applications hosted by such VMs, as well as for data stored on storage unit 504.

FIGS. 6A and 6B are block diagrams 500A and 500B of the backup subsystem, according to one embodiment. It is noted that the embodiments shown in 600A and 600B can be combined, e.g., the backup can be stored using storage device(s) as well as using cloud storage. In one embodiment, nodes 604A(1)-604A(N) and nodes 604B(1)-604B(N) can be substantially similar to each other. Both backup systems 602A and 602B are configured to store backups of the database subsystem and/or the VM subsystem. For example, backup systems 602A and 602B are configured to store backup sets of the database subsystem and/or the VM subsystem, as determined by server 110. In one embodiment, the data abstractions represent various databases that can be restored from the backup subsystem(s) of FIGS. 6A and 6B.

Backup subsystem 602A includes nodes 604A(1)-604A (N) and storage devices 606(1)-606(N). It is noted that although FIG. 6A shows a one-to-one correspondence between a node and a storage device, this is shown for illustrative purposes only, and other combinations are contemplated, such as each node being associated with multiple storage devices, and/or each storage device being associated with multiple nodes. Nodes 604A(1)-604A(N) can communicate with the server, the database subsystem, and/or the VM subsystem.

Backup subsystem 602B includes nodes 604B(1)-604B (N) and can connect to cloud storage 608. Cloud storage 608 can be implemented using network online storage, and allow nodes 604B to store data. Cloud storage 608 can be implemented using one or more servers (not shown) that give nodes 604B(1)-604B(N) access to virtualized pools of storage to store data. Nodes 604A(1)-604A(N) can communicate with the server, the database subsystem, and/or the VM subsystem.

Figure 7A:
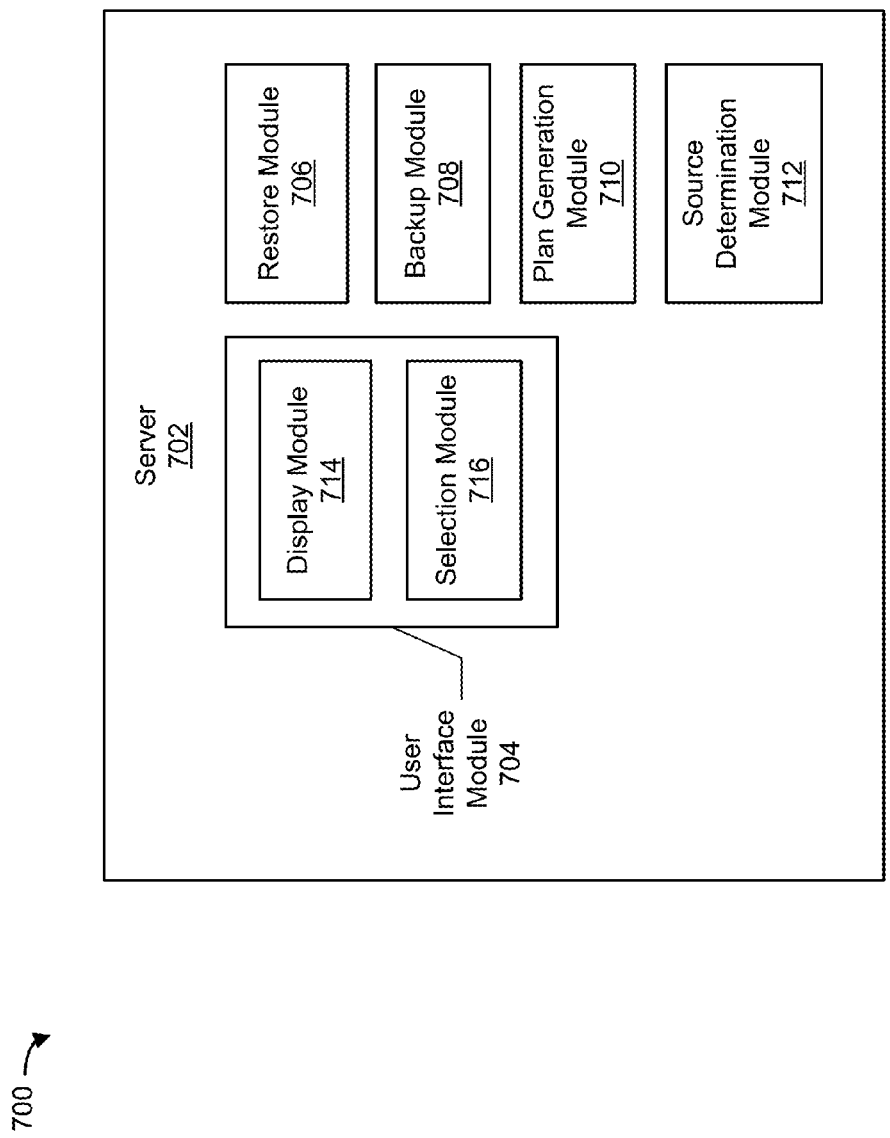
FIG. 7A is a block diagram of a server, according to some embodiments.

FIG. 7A is a block diagram 700 of a server 702, such as server 110, according to one embodiment. Server 702 includes a user interface (UI) module 704, a restore module 706, a backup module 708, a plan generation module 710, and a source determination module 712. UI module 704 can include a display module 714 and a selection module 716. It is noted that is some embodiments, one or more of these elements may be combined. For example, plan generation module 710 can be combined with source determination module 712. It is noted that one or more of modules of server 702 may be implemented as a software and/or hardware modules. It is also noted that in some embodiments one or more of elements of server 702 may not be used.

Figure 7B:
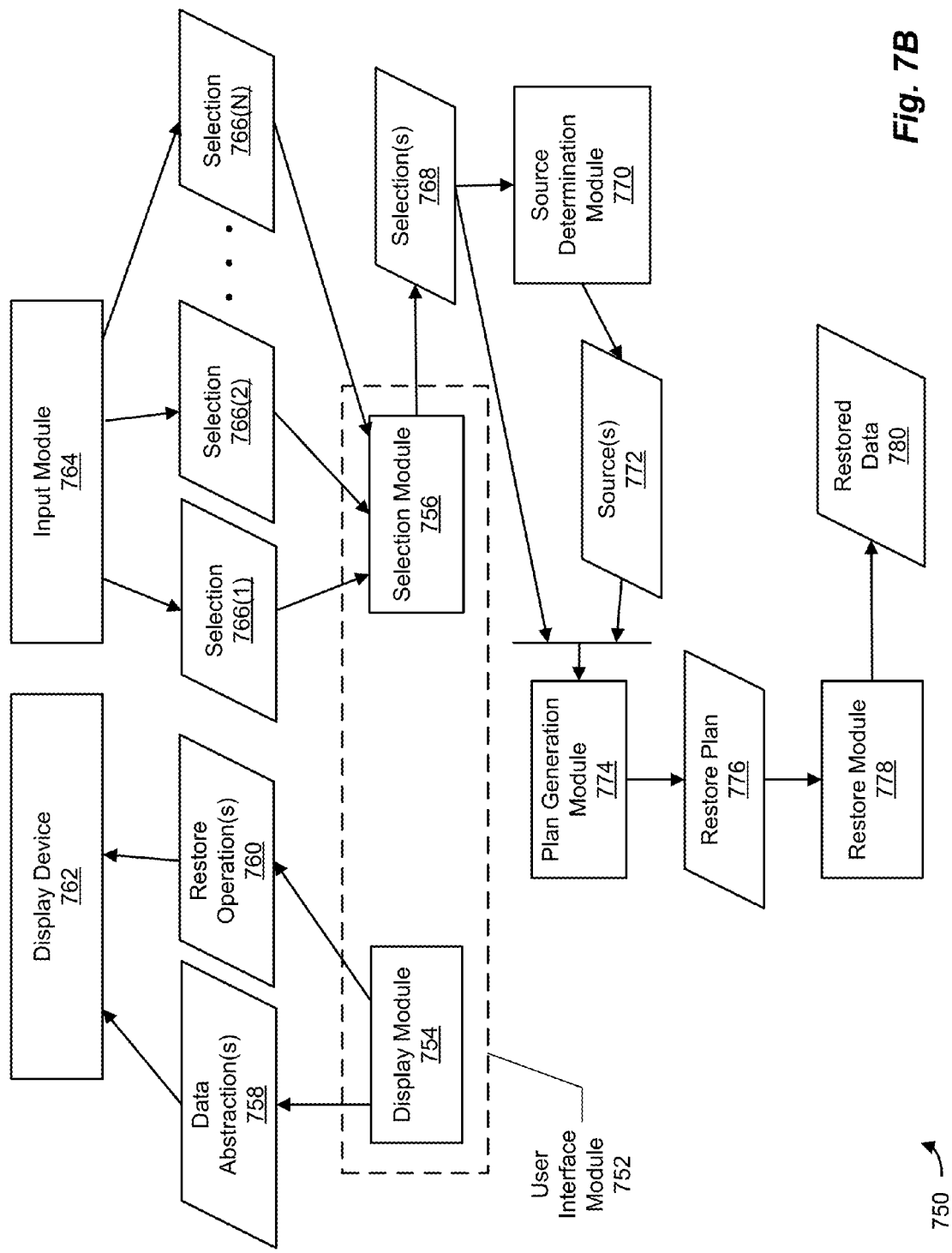
FIG. 7B is a block diagram illustrating operation of a server, according to some embodiments.

FIG. 7B is a block diagram 700 illustrating operation of a server when restoring data in distributed system, according to one embodiment. It is noted that is some embodiments, one or more of these elements may be combined. It is also noted that one or more of modules shown in block diagram 700 may be implemented as a software and/or hardware modules. It is also noted that in some embodiments, one or more of elements of shown in block diagram 700 may not be used. Furthermore, one or more elements and/or operations shown in block diagram 700 can be performed at a server, at a client, at a backup system, and/or a combination thereof.

In one embodiment, a user interface module 752 includes a display module 754 and a selection module 756. In one embodiment, user interface module 752 can be implemented on a server, such as server 110. Display module 754 can communicate elements for one or more data representations 758 and one or more restore operations 760 to a display device 762. It is noted that each restore operation 760 indicates a restore operation that is to be performed during restoration. Display device 762 can, upon receiving elements for data representation(s) 758 and restore operation(s) 760, display graphical elements corresponding to data representation(s) 758 and restore operation(s) 760. For example, display device 762 can display these graphical elements in a graphical user interface (GUI). In one embodiment, display module 754 can communicate additional elements to display device 762 facilitating generation of such a GUI. In one embodiment, display device 762 can be implemented on a client, such as client 108(1). Thus, user interface module 752 on the server can communicate elements for data representation(s) 758 and restore operation(s) 760 to display device 762 on the client. In one embodiment, the server and/or client can include additional elements used for such communication.

In one embodiment, input module 764 can communicate one or more selections 766(1)-766(N) to selection module 756 (of UI module 752). In one embodiment, input module 764 can include some type of an Input/Output (I/O) device, such as a keyboard, a mouse, a touch screen, among others, that can receive a user input selecting an element that is displayed in the GUI. In one embodiment, each of selections 766(1)-766(N) can be an indication of a selection of a certain graphical element from the GUI displayed by display device 762. In one embodiment, these selections 766 include selection 766(1) of a certain data abstraction and selection 766(2) of a certain restore operation. Selection module 756 can receive selections 766. Selection module 756 can communicate selections 768 (i.e., that substantially correspond to selections 766) to a source determination module 770 and/or a plan generation module 774.

In one embodiment, source determination module 770 determines data source(s) that correspond to the data abstraction (e.g., indicated by selection 768). In one implementation, source determination module 770 can map the data abstraction to the data source. For example, the selected data abstraction can indicate data from a human resource (HR) department. Source determination module 770 can determine that this data abstraction corresponds to recoverable database 406(1) that is hosted by database server 404(1). In one embodiment, source determination module 770 can determine that the data abstraction corresponds to backed up data for this HR database. Source determination module 770 can make this determination by accessing a mapping table (that can be stored on the server). As a result, source determination module 770 can communicate indications of one or more sources 772 to plan generation module 774. In the above example, source determination module 770 can communicate a source indication 772 indicating database 406(1).

In one embodiment, plan generation module 774 receives selections 768 from selection module 756. Plan generation module 774 generates a restore plan based on the first selection (e.g., a data abstraction indicates in selections 768) and on the second selection (e.g., a restore operation indicated in selections 768). The restore plan can indicate which backup sets to use during a restoration, as well as any restore parameters used during this restoration. In other words, in this embodiment, plan generation module 774 includes some or all of functionality of source determination module 770, and thus determines data source(s) that correspond to the data abstraction (e.g., indicated by selection 768) during generation of the restore plan. In another embodiment, plan generation module 774 receives selections 768 from selection module 756 and source indications 772 from source determination module. Plan generation module 774 generates a restore plan based on the data source(s) and on the second selection (e.g., a restore operation indicated in selections 768). The restore plan can indicate which backup sets to use during a restoration, as well as any restore parameters used during this restoration.

In both embodiments described above (i.e., plan generation module receiving selections with or without source indication 772), plan generation module communicates generated restore plan 776 to restore module 778. As noted, the restore plan can include indications of which backup sets to restore during restoration, as well as any restore parameters used during the restoration. The restore plan can also include commands used for additional processing that is to be performed before or after the backup sets are restored. In one embodiment, further details regarding plan generation module 774 and/or source determination module 770 are found in Tsaur et al., U.S. patent application Ser. No. 13/314,771, filed on Dec. 8, 2011, entitled "Systems and Methods for Restoring Application Data," which is incorporated by reference herein in its entirety and for all purposes.

Restore module 778 receives restore plan 776 from plan generation module 774. Restore module performs the restoration as indicated by restore plan 776. In one embodiment, restore module 778 is implemented on the server, and thus communicates with the backup subsystem to perform the restoration. However, in some embodiments, restore module 778 can be implemented on the backup subsystem. Restore module 778 can restore data from the backup sets as restored data 780. Restored data 780 can be stored in the original source of the data, e.g., in the source represented by the data abstraction, and/or at another location, e.g., as indicated in the restore plan.

It is noted that in one embodiment, UI module 752, source determination module 770, plan generation module 774, and restore module are implemented on a server, whereas display device 762 and input module 764 are implemented on a client. In this case, the server and/or client can include additional elements used for communication of data abstraction(s), restore operation(s) and/or selections (elements 766). However, in another embodiment, all of these modules can be implemented on the client. In yet another embodiment, all of these modules can be implemented on the server.

Figure 8B:
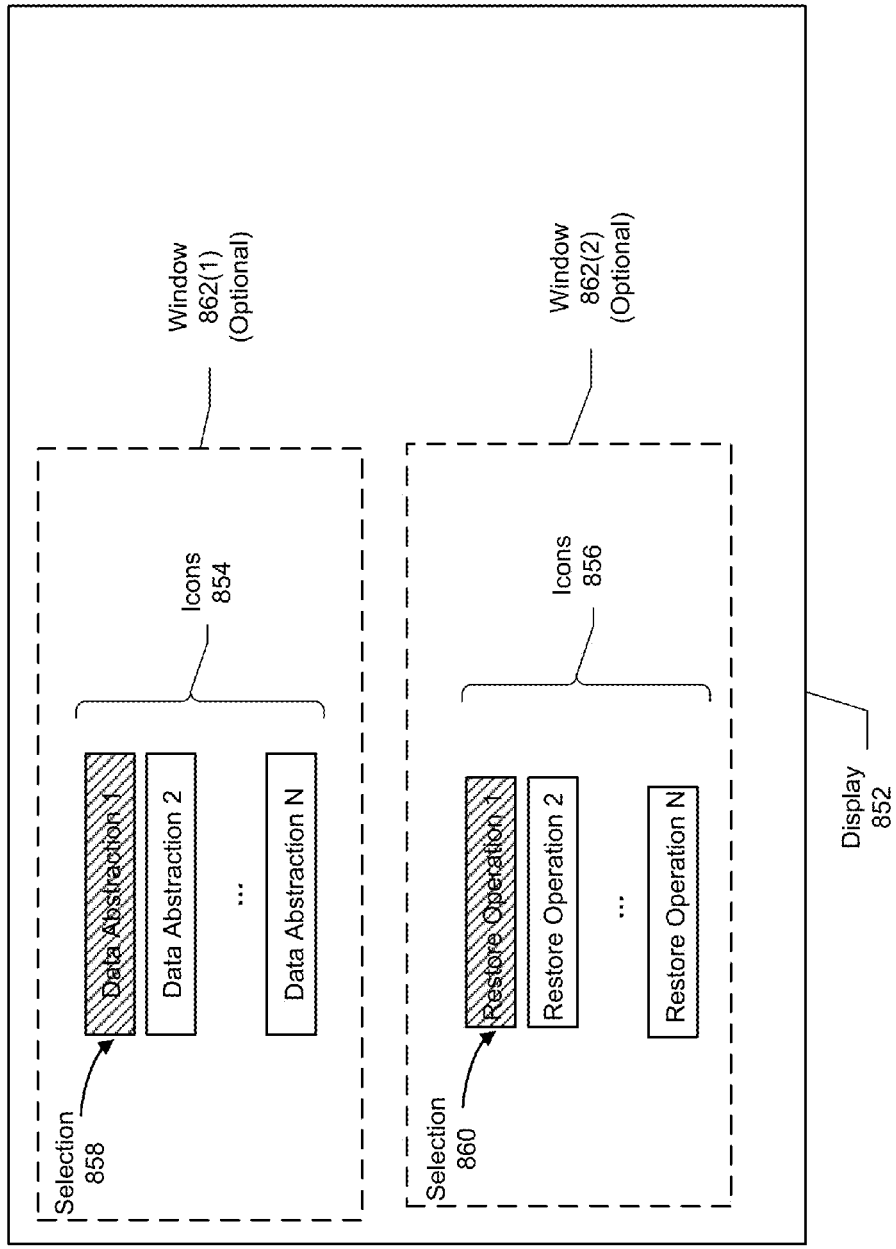

FIGS. 8A and 8B illustrate example graphical user interfaces (e.g., GUIs) for restoring data in distributed systems, according to some embodiments. FIG. 8A illustrates an example GUI 800 that can be displayed using a display device, such as display device 762. GUI 800 can is shown on a display 802. GUI 800 can display graphical elements 804 for data abstractions and graphical elements 806 for restore operations. Thus, graphical elements 804 can correspond to data abstractions that represent databases that can be restored. In one embodiment, graphical elements 804 display a logical view of the databases that can be restored, i.e., instead of displaying multiple backup sets. GUI 800 can also display a selection 808 of one of the graphical elements 804 for data abstractions. Similarly, GUI 800 can also display a selection 810 of one of graphical elements 806 for the restore operations.

FIG. 8B illustrates another example GUI 850 that can be displayed using a display device, such as display device 762. GUI 850 can is shown on a display 852. GUI 850 can display icons 854 for data abstractions and icons 856 for restore operations. Thus, icons 854 can correspond to data abstractions that represent databases that can be restored. In one embodiment, icons 854 display a logical view of the databases that can be restored, i.e., instead of displaying multiple backup sets. GUI 850 can also display a selection 858 of one of icons 854 for data abstractions. Similarly, GUI 850 can also display a selection 860 of one of icons 856 for restore operations. Furthermore, GUI 850 can optionally display a window 862(1), where icons 854 for data abstractions are displayed. Similarly, GUI 850 can optionally display a window 862(2), where icons 856 for restore operations are displayed.

FIGS. 9-12 illustrate example user interfaces for restoring data in distributed systems, according to some embodiments. In one embodiment, FIGS. 9-12 illustrate operation of a wizard that can guide a user (e.g., user of client 108(1)) through a series of displays, thus providing an easy-to-use interface for restoring databases. As noted, one or more of the FIGS. 9-12 can be used during operation of such a GUI.

Figure 9:
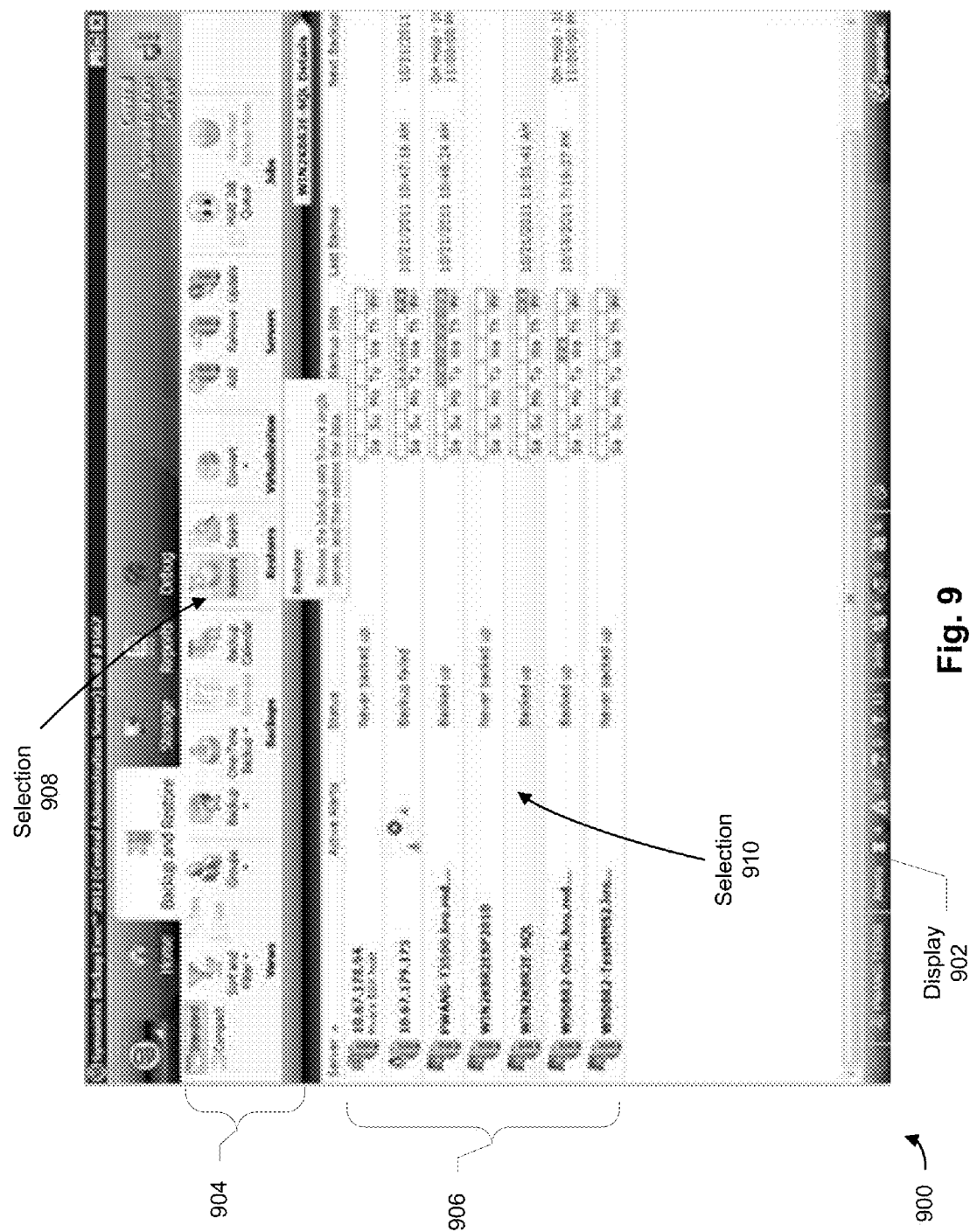
FIGS. 9-12 illustrate example user interfaces for restoring data in distributed systems, according to some embodiments.

In one embodiment, FIG. 9 illustrates a GUI 900 that is shown on display 902. GUI 900 includes a first display area 904 and a second display area 906. First display area 904 shows various icons that can indicate various operations, including backup operations, search operations, and a restore operation. Selection 908 can select one of these icons, e.g., for a certain restore operation. Second display area 906 shows various icons that can indicate various data abstractions. Selection 910 can select one of these icons, e.g., for a certain data abstraction. In one embodiment, display area 906 can also display general status information for various servers (such as servers of FIG. 4), that can be represented by the data abstractions. In one embodiment, one or both selections 908 and 910 can be selected by a user, such as by using a keyboard, a mouse, a touch screen and/or another I/O device.

Figure 10:
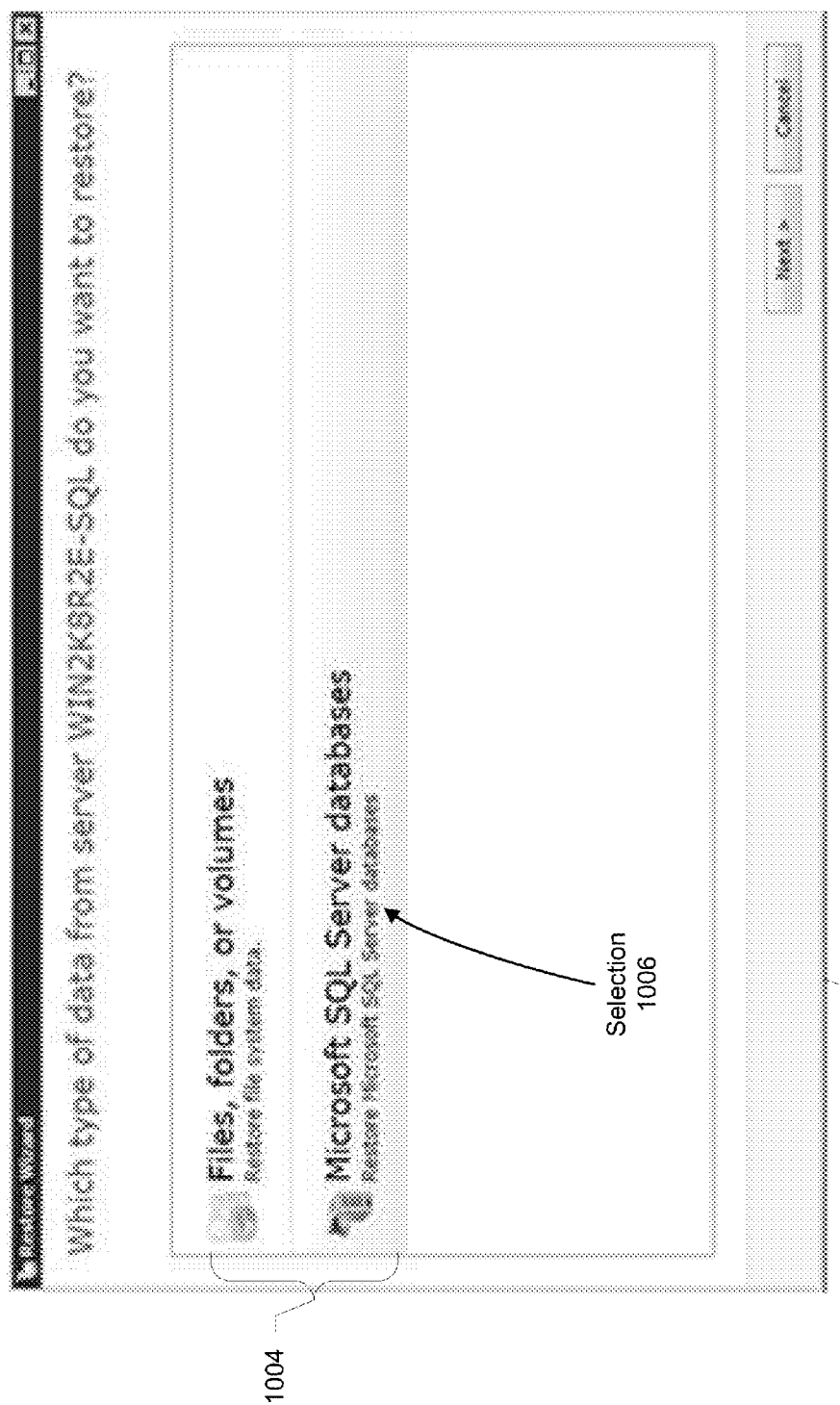

FIG. 10 illustrates a GUI 1000 that is shown on display 1002, according to one embodiment. GUI 1000 includes a display area 1004. Display area 1004 shows various icons that can indicate various data abstractions. Selection 1006 can select one of these icons, e.g., corresponding to a certain data abstraction. In one embodiment, selection 1006 can be selected by a user, such as by using a keyboard, a mouse, a touch screen and/or another I/O device. In one embodiment, icons shown in area 1004 represent a type of recovery (i.e., restoration) that is to be performed, such as on the data abstractions chosen in element 910. For example, selection 1006 can indicate that the recovery will restore SQL database(s).

Figure 11:
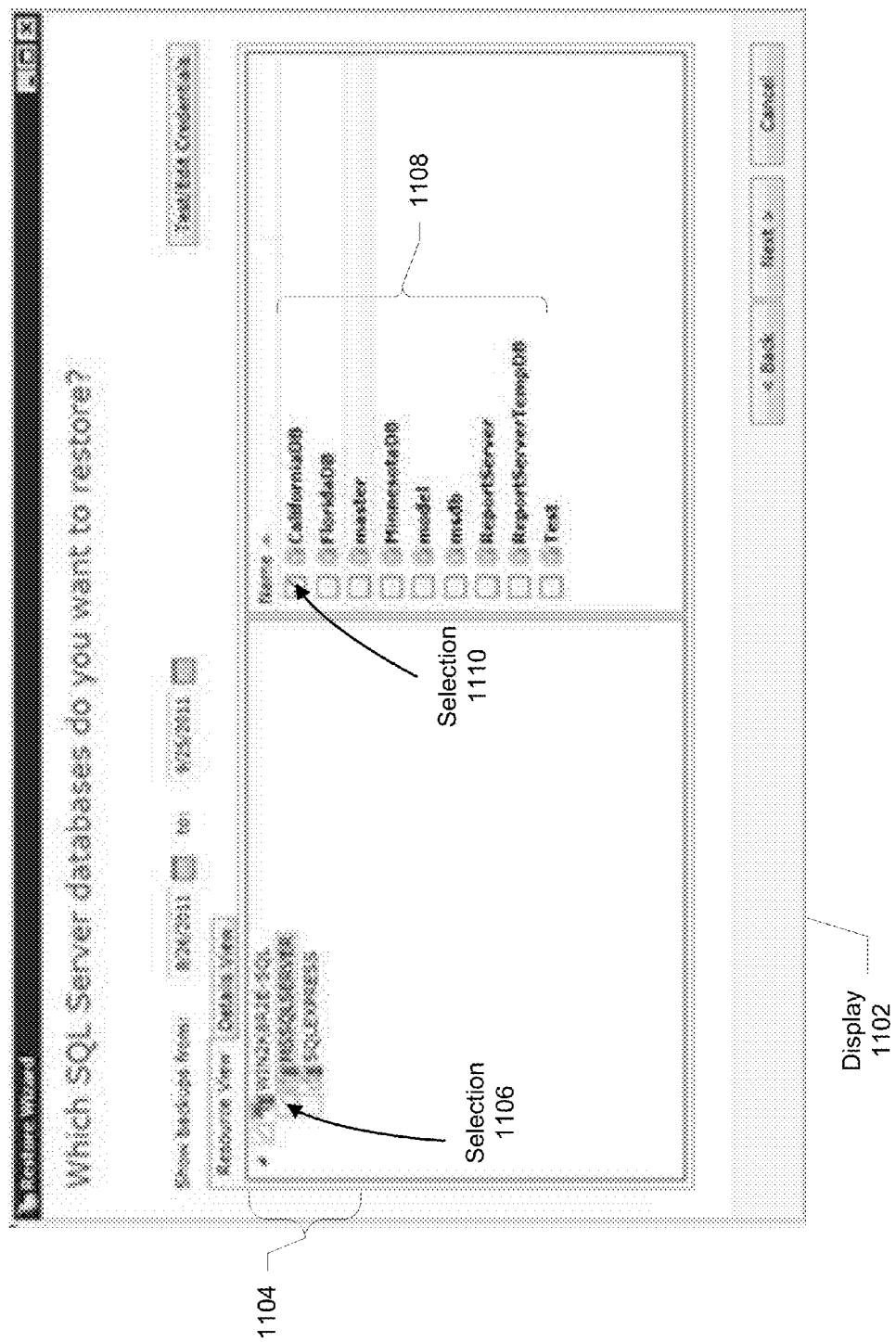

FIG. 11 illustrates a GUI 1100 that is shown on display 1102, according to one embodiment. GUI 1100 includes a first display area 1104 and a second display area 1108. First display area 1104 shows various icons that can indicate a first level of data abstraction, such as various resources. These resources can represent a certain database server as well as instances of this database server, which can be graphically presented in a hierarchical tree format. Selection 1106 can select one of these data abstractions, e.g., a first instance (SQLEXPRESS) of an SQL server (WIN2K8R2E-SQL).

Second display area 1108 shows various icons that can indicate a second level of data abstractions. In one embodiment, second display area 1108 shows icons for second level of data abstractions that correspond to selection 1106. Selection 1110 can select one of these icons, e.g., corresponding to a certain data abstraction. In one embodiment, the icons for second level of abstraction 1108 can indicate names of databases, e.g., databases of the SQL database selected using selection 1106. In one embodiment, second display area 1108 is populated with icons that correspond to the selected icon in selection 1106. In one embodiment, icons shown in area 1108 represent databases 406(1)-406(N). In one embodiment, one or both selections 908 and 910 can be selected by a user, such as by using a keyboard, a mouse, a touch screen and/or another I/O device. In one embodiment, FIGS. 9-11 illustrate a first selection of methods 200 and 250. It is noted that in some embodiments, not all of FIGS. 9-11 are used. For example, the first selection that identifies the data abstraction can include selection 1006 of FIG. 10.

Figure 12:
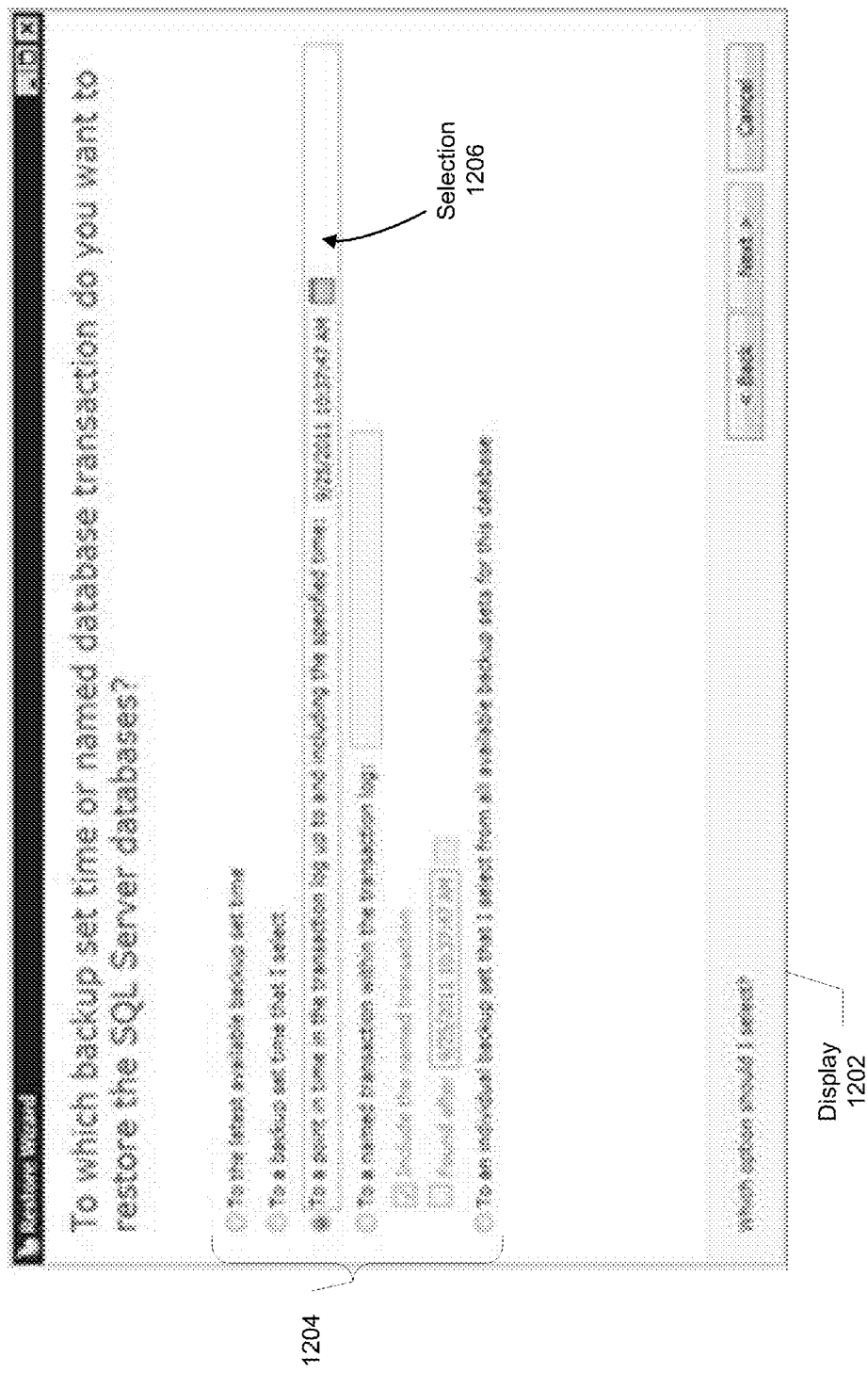

FIG. 12 illustrates a GUI 1200 that is shown on display 1202, according to one embodiment. GUI 1200 includes a display area 1204. Display area 1204 shows various icons that can indicate various restore operations. Selection 1206 can select one of these icons, e.g., corresponding to a certain restore operation. In one embodiment, selection 1206 can be selected by a user, such as by using a keyboard, a mouse, a touch screen and/or another I/O device. For example, selection 1206 can select a restoration operation for restoration of data to a point in time in the transaction log up to and including a specified time. In one embodiment, GUI 1200 can also provide for additional selections, such as for indicating the specified time for the selected restore operation.

The restore options can include 1) restoring data to the latest available backup set, 2) restoring data to a backup set time that is selected, 3) restoring data to a point in time in a transaction log, such as up to and including a specified time, 4) restoring data to a named transaction within the transaction log, or 5) to an individual backup set that is selected for available backup sets, e.g., such as for a user-selected database. The fifth option can use sources 772 as determined from the user selections. In one embodiment, for this fifth option, GUI 1200 can allow a selection of individual backup sets, restore parameters, and/or additional processing. In one embodiment, if there is no selection of any of the restore operations, one of the options (e.g., perform a restoration to the latest available backup set associated with the selected data abstraction) is automatically selected to be the default restore operation.

Figure 13:
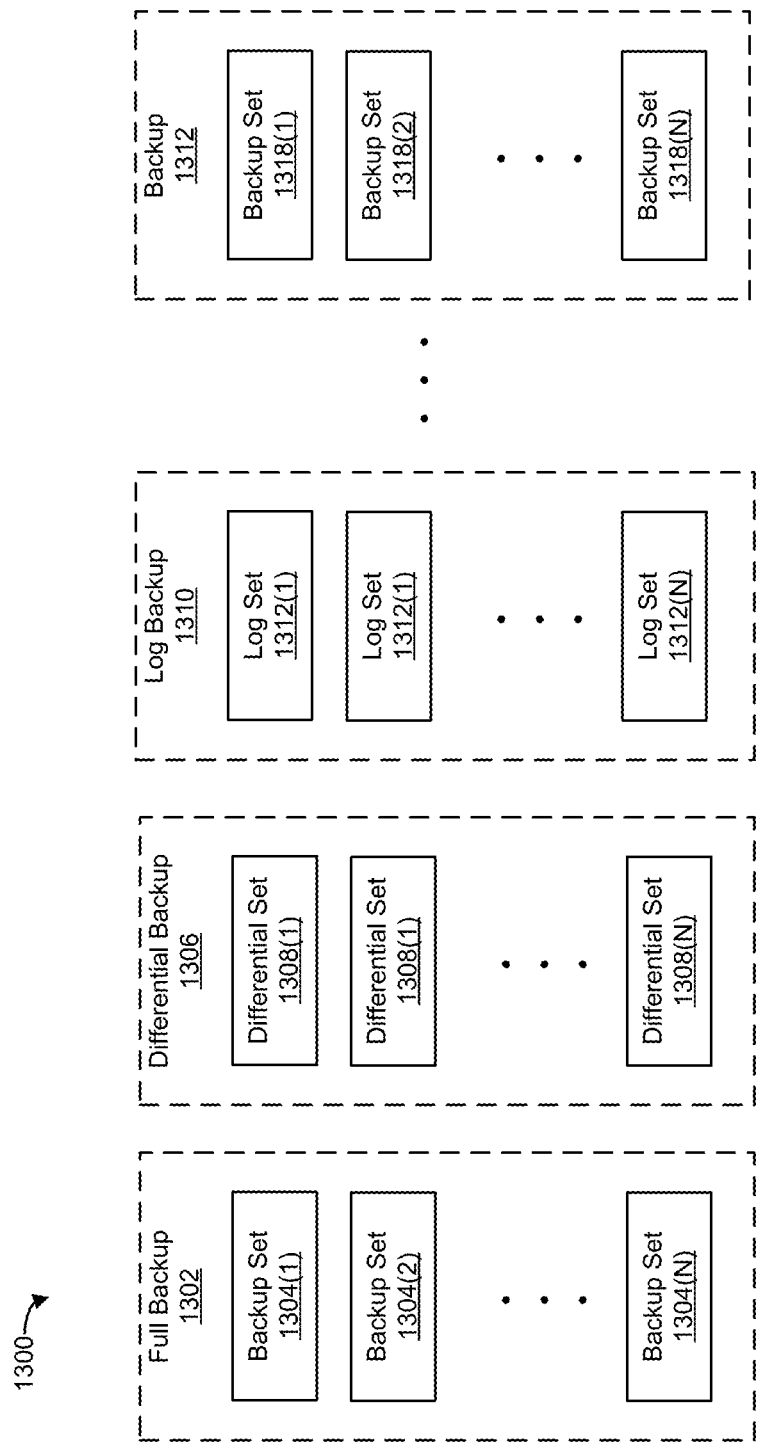
FIG. 13 is a block diagram of various backup sets, according to some embodiments.

FIG. 13 is a block diagram 1300 illustrating various backup sets, according to some embodiments. As noted, the backup subsystem can generate backup sets (i.e., when performing backups) using a variety of backup techniques. The backup operations can be determined by the server, client(s), and/or the backup subsystem. For example, backup techniques can be selected using the GUI of FIG. 9. With reference to FIG. 4, databases 404(1)-404(N) can be backed up, using multiple techniques, to generate multiple backup sets. The backups of FIG. 13 can also include backups of the VM subsystem, including backups of the databases(s) of these VMs.

In one embodiment, a backup set corresponds to a backup that was made at a particular point in time. Backups can include full backup 1302, differential backup 1306, log backup 1310, and/or other backups 1312. Full backup 1302 can include backup sets 1304(1)-1304(N). Differential backup 1306 can include backup sets 1308(1)-1308(N), where each backup set can be a cumulative differential backup. Log backup 1310 can include backup sets 1312(1)-1312(N), where each backup set can be a transaction log. Similarly, other backup 1312 can include backups 1318(1)-1318(N). For example, an SQL database can be backed-up using a full backup every one hr, using a differential backup every 20 minutes, and using a log backup every 5 minutes. Each one of these backup operations can generate various backup sets (that are stored by the backup subsystem).

Figure 14:
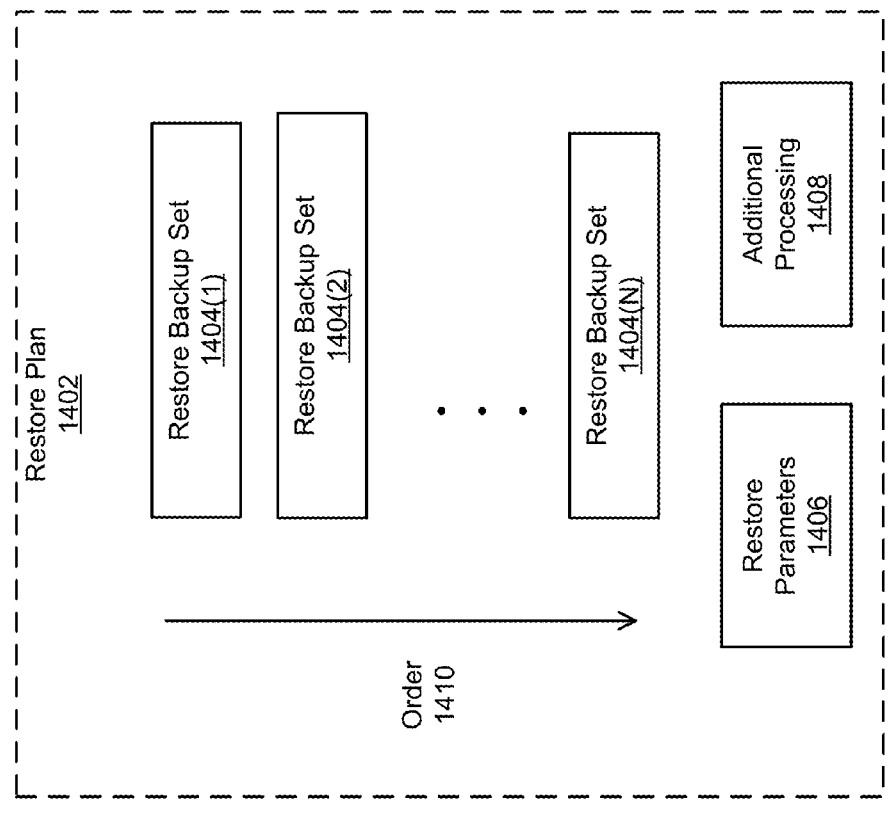
FIG. 14 illustrates a restore plan, according to one embodiment.

FIG. 14 is a diagram 1400 illustrating a restore plan 1402, according to one embodiment. Restore plan 1402 can be generated by the plan generation module and be used, such as by the restore module, to perform a restoration of data. As described above, restore plan 1402 is generated based on received selections (and in some embodiments, including data source indications). Restore plan 1402 is used to generate restored data. Restore plan includes selections of various backup sets 1404(1)-1404(N). Restore plan can also include restore parameters 1406. Restore plan 1402 can also indicate an order (e.g., restore order 1410) in which the backup sets are to be restored. Restore plan 1402 can also include additional processing 1408, which can be instructions (i.e., to be used by the restore module) after and/or before the backup sets are restored in the specified order.

For example, in order to restore an HR database to a latest point in time (e.g., the first restore operation of FIG. 12), restore plan 1402 should indicate that the latest full backup set for this HR database is selected first, followed by the latest differential backup set for this HR database, and lastly by the log backup sets (i.e., subsequent to the latest differential backup set) for this HR database. In another example, in order to restore a certain marketing database to a certain point in time (e.g., the second restore operation of FIG. 12), restore plan 1402 should indicate that the full backup set prior to this certain time for this marketing database is selected first, followed by a certain differential backup set for this marketing database (also prior to the selected time), and by the log backup sets subsequent to the certain differential backup set (i.e., up to and including the log backup set containing data prior to the selected time).

In another example, in order to restore a certain engineering database to a point in time in a transaction log, up to and including a certain time (e.g., the third restore operation of FIG. 12), restore plan 1402 should indicate that the full backup set prior to this certain time for this engineering database is selected first, followed by a certain differential backup set for this engineering database (also prior to the selected time), and by the log backup sets subsequent to the certain differential backup set (i.e., up to and including the log backup set containing data prior to the selected time). In yet another example, in order to restore a certain sales database to a named transaction within the transaction log, (e.g., the fourth restore operation of FIG. 12), restore plan 1402 should indicate that the full backup set prior to a time that this transaction took place for this sales database is selected first, followed by a certain differential backup set for this sales database (also prior to the time of this transaction), and by the log backup sets subsequent to the certain differential backup set (i.e., up to and including the log backup set containing data prior to the selected transaction).

In other words, the plan generation module generates restore plan 1402 that can be used to restore the backup sets in the proper order to perform the restore operation as specified by the GUI selections. However, the GUI selections do not specify the backup sets, restore order, restore parameters, or the additional processing. Instead, the backup sets, restore order, restore parameters, or the additional processing are determined by the plan generation module and/or the source determination module.

Figure 15:
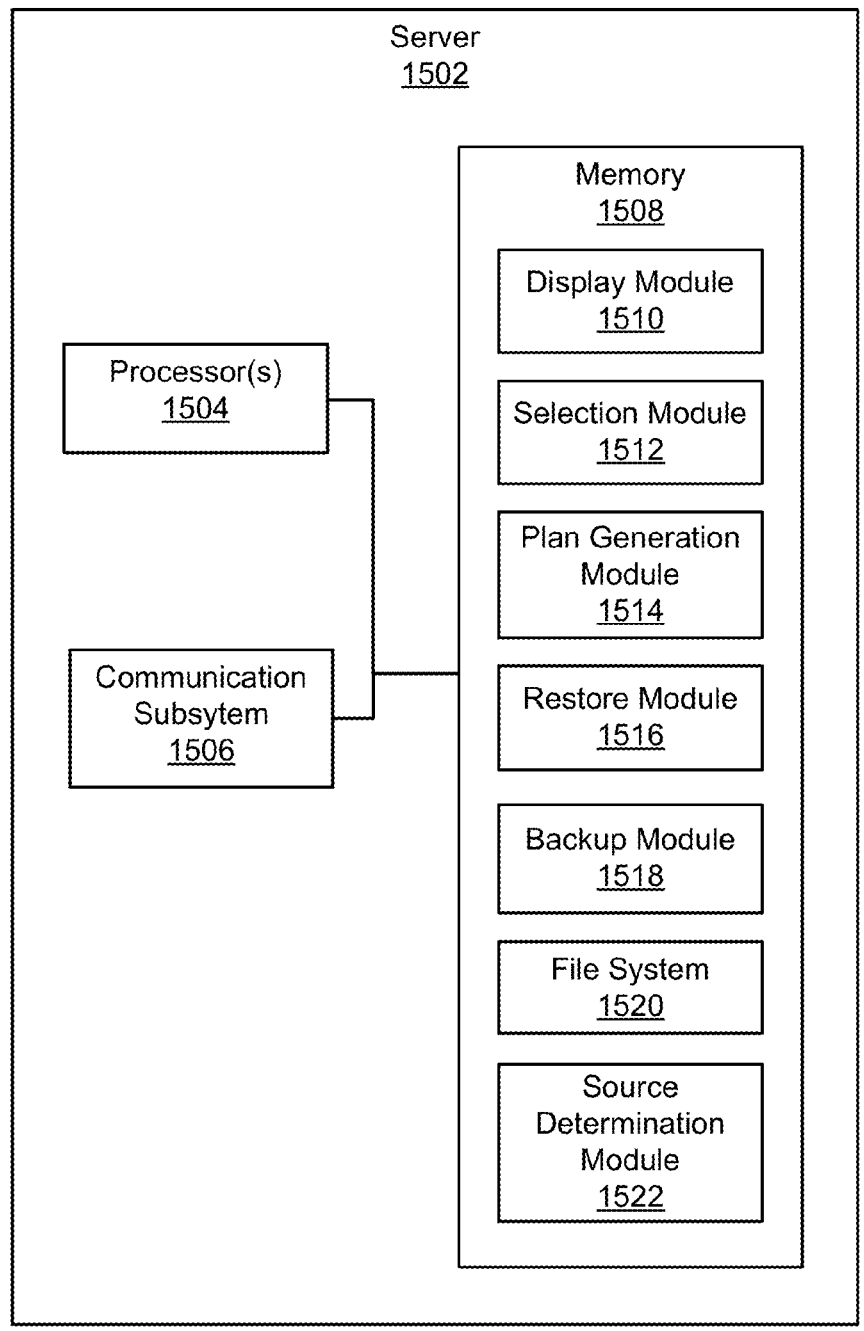
FIG. 15 is a block diagram illustrating various components of a server, according to one embodiment.

FIG. 15 is a block diagram 1500 of a server 1502, such as server 1110 and/or 702. Server 1502 includes a processor 1504, communication subsystem 1506, and a memory 1508. Memory 1508 includes a display module 1510, a selection module 1512, a plan generation module 1514, a restore module 1516, a backup module 1518, a file system 1520, and a source determination module 1522. It is noted that is some embodiments, one or more of these elements may be combined. For example, source determination module and plan generation module may be combined into one module. It is also noted that one or more of modules 1510-1522 may be implemented as a software and/or hardware module. It is also noted that in some embodiments one or more of elements of server 1502 may not be used. Processor(s) 1504 can execute one or more of modules 1510-1522. One or more of modules 1510-1522 can implement at least portions of methods 200, 250, 300, and/or 350. In one embodiment, modules 1510-1522 can operate as described with reference to FIG. 7B.

Figure 16:
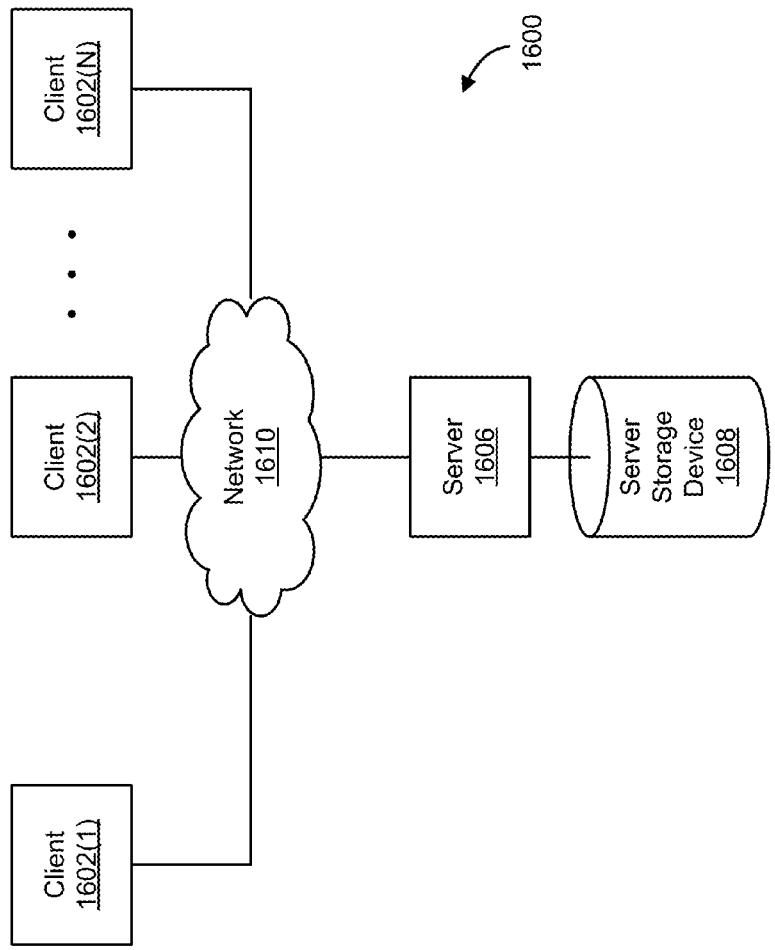
FIG. 16 is a block diagram illustrating a network architecture in which embodiments of the present application can be implemented.

Elements of network architecture can be implemented using different computer systems and networks. An example of one such network environment is described below with reference to FIG. 16. FIG. 16 is a simplified block diagram illustrating a network architecture 1600 in which one or more clients are provided with access to a server via various network connections. As depicted in FIG. 16, clients 1602(1)-(N) are coupled to a network 1610, and so are able to access a server 1606 (which can be used to implement server(s) and node(s) of FIGS. 1, 4, 5, 6A, 6B, and/or 7A) via network 1610. Other servers (not shown) can be used instead to implement server(s) and node(s) of FIGS. 1, 4, 5, 6A, 6B, and/or 7A). A client can be implemented using, for example, a desktop computer, a laptop computer, a workstation, a server, a cell phone, a smart phone, a network-enabled personal digital assistant (PDA), or the like. An example of network 1610, which can be used by clients 1602(1)-(N) to access server 1606, is the Internet. Alternatively, access to server 1606 can be provided by a local area network (LAN) utilizing Ethernet, IEEE 802.11x, or some other communications protocol. As will be appreciated, server 1606 can be accessed by clients coupled directly thereto (not shown).

As also depicted on FIG. 16, server 1606 is coupled to a server storage device 1608, which includes a data volume such as storage 116 and/or storage 404, among others. Server storage device 1608 can be implemented as a single storage device or a collection of storage devices. Server storage device 1608 can also be implemented as a storage area network, which couples remote storage devices to a server (e.g., server 1606), such that the remote storage devices appear as locally-attached storage devices to the server's OS, for example.

In light of the present disclosure, those of skill in the art will appreciate that server storage device 1608 can be implemented by any type of computer-readable storage medium, including, but not limited to, internal or external hard disk drives (HDD), optical drives (e.g., CD-R, CD-RW, DVD-R, DVD-RW, and the like), flash memory drives (e.g., USB memory sticks and the like), tape drives and the like. Alternatively, those of skill in the art will also appreciate that, in light of the present disclosure, network architecture 1600 can include other components such as routers, firewalls and the like that are not germane to the discussion of the present network and will not be discussed further herein. Those of skill in the art will also appreciate that other configurations are possible. For example, clients 1602(1)-(N) can be directly coupled to server storage device 1608 without the user of a server or Internet; server 1606 can be used to implement both the clients and the server; network architecture 1600 can be implemented without the use of clients 1602(1)-(N); and so on.

As an example implementation of network architecture 1600, server 1606, services requests to data generated by clients 1602(1)-(N) to data stored in server storage device 1608. Any of the functionality of the nodes, agents, and/or administration modules can be implemented using one of the server(s) and node(s) of FIGS. 1, 4, 5, 6A, 6B, and/or 7A.

Figure 17:
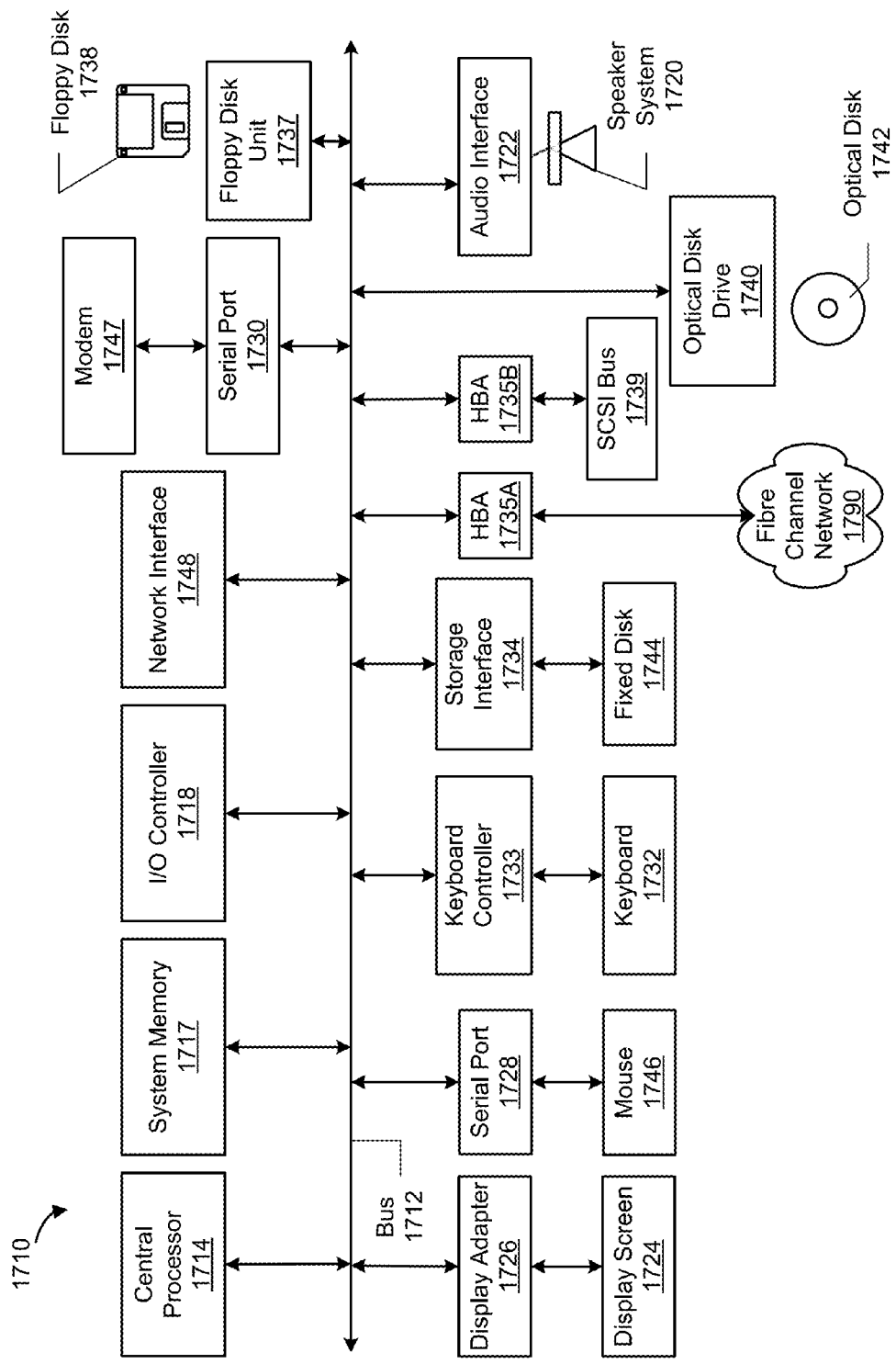
FIG. 17 is a block diagram that illustrates an example of a computer system suitable for implementing embodiments of the present application.

FIG. 17 depicts a block diagram of a computer system 1710 suitable for implementing the present disclosure. Computer system 1710 may be illustrative of various computer systems in the networked system of FIG. 1, such as node(s) and/or coordinator node(s), among others. Computer system 1710 includes a bus 1712 which interconnects major subsystems of computer system 1710, such as a central processor 1714, a system memory 1717 (typically RAM, but which may also include ROM, flash RAM, or the like), an input/output controller 1718, an external audio device, such as a speaker system 1720 via an audio output interface 1722, an external device, such as a display screen 1724 via display adapter 1726, serial ports 1728 and 1730, a keyboard 1732 (interfaced with a keyboard controller 1733), a storage interface 1734, a floppy disk drive 1737 operative to receive a floppy disk 1738, a host bus adapter (HBA) interface card 1735A operative to connect with a Fibre Channel network 1790, a host bus adapter (HBA) interface card 1735B operative to connect to a SCSI bus 1739, and an optical disk drive 1740 operative to receive an optical disk 1742. Also included are a mouse 1746 (or other point-and-click device, coupled to bus 1712 via serial port 1728), a modem 1747

(coupled to bus 1712 via serial port 1730), and a network interface 1748 (coupled directly to bus 1712).

Bus 1712 allows data communication between central processor 1714 and system memory 1717, which may include read-only memory (ROM) or flash memory (neither shown), and random access memory (RAM) (not shown), as previously noted. The RAM is generally the main memory into which the operating system and application programs are loaded. The ROM or flash memory can contain, among other code, the Basic Input-Output system (BIOS) which controls basic hardware operation such as the interaction with peripheral components. Applications resident with computer system 1710 are generally stored on and accessed via a computer readable medium, such as a hard disk drive (e.g., fixed disk 1744), an optical drive (e.g., optical drive 1740), a floppy disk unit 1737, or other storage medium. Additionally, applications can be in the form of electronic signals modulated in accordance with the application and data communication technology when accessed via network modem 1747 or interface 1748.

Storage interface 1734, as with the other storage interfaces of computer system 1710, can connect to a standard computer readable medium for storage and/or retrieval of information, such as a fixed disk drive 1744. Fixed disk drive 1744 may be a part of computer system 1710 or may be separate and accessed through other interface systems. Modem 1747 may provide a direct connection to a remote server via a telephone link or to the Internet via an internet service provider (ISP). Network interface 1748 may provide a direct connection to a remote server via a direct network link to the Internet via a POP (point of presence). Network interface 1748 may provide such connection using wireless techniques, including digital cellular telephone connection, Cellular Digital Packet Data (CDPD) connection, digital satellite data connection or the like.

Many other devices or subsystems (not shown) may be connected in a similar manner (e.g., document scanners, digital cameras and so on). Conversely, all of the devices shown in FIG. 17 need not be present to practice the present disclosure. The devices and subsystems can be interconnected in different ways from that shown in FIG. 17. The operation of a computer system such as that shown in FIG. 17 is readily known in the art and is not discussed in detail in this application. Code for using server(s) for restoring data (such as described above with reference to the methods of FIGS. 2A, 2B, 3A, and/or 3B), etc., to implement the present disclosure can be stored in computer-readable storage media such as one or more of system memory 1717, fixed disk 1744, optical disk 1742, or floppy disk 1738. Memory 1720 is also used for storing temporary variables or other intermediate information during the execution of instructions by the processor 1710. The operating system provided on computer system 1710 may be MS-DOS®, MS-WINDOWS®, OS/2®, UNIX®, Linux®, or another known operating system.

Moreover, regarding the signals described herein, those skilled in the art will recognize that a signal can be directly transmitted from a first block to a second block, or a signal can be modified (e.g., amplified, attenuated, delayed, latched, buffered, inverted, filtered, or otherwise modified) between the blocks. Although the signals of the above described embodiment are characterized as transmitted from one block to the next, other embodiments of the present disclosure may include modified signals in place of such directly transmitted signals as long as the informational and/or functional aspect of the signal is transmitted between blocks. To some extent, a signal input at a second block can be conceptualized as a second signal derived from a first signal output from a first block due to physical limitations of the circuitry involved (e.g., there will inevitably be some attenuation and delay). Therefore, as used herein, a second signal derived from a first signal includes the first signal or any modifications to the first signal, whether due to circuit limitations or due to passage through other circuit elements which do not change the informational and/or final functional aspect of the first signal.

Although the present invention has been described in connection with several embodiments, the invention is not intended to be limited to the specific forms set forth herein. On the contrary, it is intended to cover such alternatives, modifications, and equivalents as can be reasonably included within the scope of the invention as defined by the appended claims.

What is claimed is:

1. A method comprising:
    receiving a first selection, wherein
        the first selection identifies a data abstraction, and
        the data abstraction represents a data source;
    receiving a second selection, wherein
        the second selection identifies a restore operation,
        the restore operation is associated with the data abstraction, and
        the second selection is chosen from a list of one or more restore operations, wherein
            each restore operation from the list is customized for the data abstraction,
            any restore operation that cannot be performed for the data abstraction is not made available in the list, and
            the list is automatically generated based on the data abstraction identified by the first selection;
    automatically determining one or more data sources of a plurality of data sources, wherein
        the determining is based on the first selection, and
        the restore operation is configured to restore data of the one or more data sources;
    automatically determining one or more first backup sets, wherein
        the one or more first backup sets comprise at least a portion of a backup of the one or more data sources, and
        the one or more first backup sets are selected based on the second selection; and
    generating one or more SQL commands, wherein
        the one or more SQL commands are configured to cause restoration of the one or more first backup sets.

2. The method of claim 1, further comprising:
    determining the data to be restored, wherein
        the determining is based on
            the data source(s), and
            the second selection, and
        the determining generates determined data.

3. The method of claim 2,
    restoring the data, wherein
        the restoring is based on the determined data, and
        the restoring generates restored data.

4. The method of claim 1, wherein
    restoring accesses a backup subsystem,
    the backup subsystem comprises a plurality of backups,
    the plurality of backups comprises the one or more first backup sets, and
    the restoring generates restored data by accessing the one or more first backup sets.

5. The method of claim 1, further comprising
generating a restore plan, wherein
    the restore plan is generated based on
        the data source(s), and
        the second selection, and
restoring the data, wherein
    the restoring generates restored data, and
    the restoring is based on the restore plan.
6. The method of claim 5, wherein
the generating the restore plan comprises
    the automatically determining the one or more first
        backup sets, wherein
        the automatically determining the one or more first
            backup sets is further based on the data source(s),
            and
            a type of the restore operation, and
the restore plan comprises a selection of the one or more
    first backup sets.
7. The method of claim 6, wherein
the type of the restore operation indicates restoring the
    data to a latest backup.
8. The method of claim 6, wherein
the type of the restore operation indicates restoring the
    data to a first time.
9. The method of claim 6, wherein
the type of the restore operation indicates a restore to a
    first time in a transaction log.
10. The method of claim 6, wherein
the type of the restore operation indicates a restore to a
    first transaction of a plurality of transactions.
11. The method of claim 1, further comprising:
displaying a plurality of data representations, wherein
    the plurality of data representations comprises a first
        data representation,
    the plurality of data representations comprises addi-
        tional data representations, and
    the first selection is indicative of
        the first data representation being selected, and
        the other data representations not being selected.
12. The method of claim 1, further comprising:
displaying a plurality of restore operations, wherein
    the plurality of restore operations comprises the restore
        operation,
    the plurality of restore operations comprises one or
        more additional restore operations, and
    the second selection is indicative of
        the first restore operation being selected, and
        the other one or more additional restore operations
            not being selected.
13. The method of claim 1, further comprising:
displaying a plurality of icons, wherein
    each of the plurality of icons indicates one of a plurality
        of data representations,
    the first selection is indicative of a selection of a first
        icon of the plurality of icons.
14. The method of claim 1, further comprising:
displaying a plurality of icons, wherein
    each of the plurality of icons indicates one of a plurality
        of restore operations, and
    the second selection is indicative of a selection of a first
        icon of the plurality of icons.
15. The method of claim 1, wherein
the determining the data source(s) comprises
    mapping the data abstraction to the data source.

16. The method of claim 1, wherein:
the first selection is comprised in a first user input,
the second selection is comprised in a second user input,
    and
the list comprises one or more restore operations that are
    configured to be performed for the data abstraction
    identified by the first selection.
17. A system comprising:
a processor;
a display module, wherein
    the display module is configured to
        display a plurality of data, and
        display a plurality of restore operations;
a selection module, wherein
    the selection module is configured to
        receive a first selection, wherein
            the first selection identifies a data abstraction, and
            the data abstraction represents a data source, and
        receive a second selection, wherein
            the second selection indicates a restore operation
                of the plurality of restore operations,
            the restore operation is related to the data, and
            the second selection is chosen from a list of one or
                more restore operations, wherein
                each restore operation from the list is custom-
                    ized for the data abstraction,
                any restore operation that cannot be performed
                    for the data abstraction is not made available in
                    the list, and
                the list is automatically generated based on the
                    data abstraction identified by the first selection;
a source determination module, configured to be executed
    using the processor, wherein
    the source determination module is configured to auto-
        matically determine one or more data sources of a
        plurality of data sources,
    the restore operation is configured to restore data of the
        one or more data sources,
    the determination is based on the first selection,
    the source determination module is further configured
        to automatically determine one or more first backup
        sets,
    the one or more first backup sets comprise at least a
        portion of a backup of the one or more data sources,
        and
    the one or more first backup sets are selected based on
        the second selection; and
a plan generation module, configured to be executed using
    the processor, and further configured to
    generate one or more SQL commands, wherein
        the one or more SQL commands are configured to
            cause a restoration of the one or more first backup
            sets.
18. The system of claim 17, further comprising:
a restore module, wherein
    the restore module is configured to
        restore the data, and
        the restoration is based on
            the one or more SQL commands,
            the one or more data sources, and
            the second selection.
19. A computer program product for restoring data in a
distributed storage system, the computer program product
comprising a non-transitory computer-readable storage
medium having a plurality of instructions embodied therein,
wherein said plurality of instructions comprises: a first set of
instructions, executable on a computer system, configured to receive a first selection, wherein
the first selection identifies data abstraction, and
the data abstraction represents a data source;
a second set of instructions, executable on the computer system, configured to
receive a second selection, wherein
the second selection identifies a restore operation,
the restore operation is associated with the data abstraction, and
the second selection is configured to be chosen from a list of one or more restore operations, wherein
each restore operation from the list is customized for the data abstraction,
any restore operation that cannot be performed for the data abstraction is not made available in the list, and
the list is configured to be automatically generated based on the data abstraction identified by the first selection;
a third set of instructions, executable on the computer system, configured to
automatically determine one or more data sources of a plurality of data sources based on the first selection, wherein
the restore operation is configured to restore data of the one or more data sources, and
the determining is based on the first selection;

a fourth set of instructions, executable on the computer system, configured to
automatically determine one or more first backup sets, wherein
the one or more first backup sets comprise at least a portion of a backup of the one or more data sources, and
the one or more first backup sets are selected based on the second selection; and
a fifth set of instructions, executable on the computer system, configured to
generate one or more SQL commands, wherein
the one or more SQL commands are configured to cause a restoration of the one or more first backup sets.

20. The computer program product of claim 19, wherein the instructions further comprise:
a sixth set of instructions, executable on the computer system, configured to
determine the data to be restored, wherein
the determining is based on
the data source(s), and
the second selection, and
the determining generates determined data.

* * * * *